(12) United States Patent
Haehnel et al.

(10) Patent No.: US 10,640,305 B2
(45) Date of Patent: May 5, 2020

(54) DEVICE AND METHOD FOR TRANSFERRING BLISTER PACKS

(71) Applicant: Uhlmann Pac-Systeme GmbH & Co. KG, Laupheim (DE)

(72) Inventors: Bernd Haehnel, Stutensee (DE); Sebastian Binder, Schwendi (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 0 days.

(21) Appl. No.: 16/377,904

(22) Filed: Apr. 8, 2019

(65) Prior Publication Data

US 2019/0322470 A1 Oct. 24, 2019

(30) Foreign Application Priority Data

Apr. 23, 2018 (EP) ..................... 18168647

(51) Int. Cl.
  *B65G 47/91* (2006.01)
  *B65B 35/38* (2006.01)
  *B65B 35/44* (2006.01)

(52) U.S. Cl.
  CPC ............ *B65G 47/918* (2013.01); *B65B 35/38* (2013.01); *B65B 35/44* (2013.01)

(58) Field of Classification Search
  CPC ...... B65G 47/91; B65G 47/918; B65G 47/04; B65G 47/06; B65B 35/18; B65B 35/50; B65B 35/44; B65B 35/38
  USPC ............................................ 198/469.1, 468.4
  See application file for complete search history.

(56) References Cited

U.S. PATENT DOCUMENTS

| | | | | |
|---|---|---|---|---|
| 5,862,646 A | * | 1/1999 | Orillo | B65B 5/08 |
| | | | | 198/345.1 |
| 7,128,520 B2 | * | 10/2006 | Monti | B65B 35/50 |
| | | | | 414/794.2 |
| 7,934,355 B2 | * | 5/2011 | Strub | A61J 7/04 |
| | | | | 53/55 |
| 9,260,212 B2 | * | 2/2016 | Monti | B65B 43/185 |

(Continued)

FOREIGN PATENT DOCUMENTS

| | | | | |
|---|---|---|---|---|
| DE | 10 2004 043332 A1 | | 3/2006 | |
| DE | 102006047925 A1 | * | 4/2008 | ............. B65G 47/52 |

(Continued)

OTHER PUBLICATIONS

International Search Report for European Application No. 18168647.8, dated Sep. 27, 2018, 7 pgs.

*Primary Examiner* — James R Bidwell
(74) *Attorney, Agent, or Firm* — Dickinson Wright PLLC

(57) ABSTRACT

Several blister packs are first transferred from a stamping station to an intermediate place element, where the blister packs are placed next to each other in a row in several intermediate place positions. Then the several blister packs in the several intermediate place positions are picked simultaneously from above, moved, and placed from above in several final place positions on a conveyor means. The blister packs in the final place positions are arranged next to each other in a row parallel to the row of blister packs in the intermediate place positions. After the blister packs have been placed in the final place positions, they have the same side facing up as in the intermediate place positions but now with a rotation of 180° around their centers.

15 Claims, 21 Drawing Sheets

(56) References Cited

U.S. PATENT DOCUMENTS

| | | | | |
|---|---|---|---|---|
| 2003/0138313 A1* | 7/2003 | Monti | ................ | B65B 35/04 |
| | | | | 414/796.7 |
| 2005/0126115 A1* | 6/2005 | Battisti | ................ | B65B 35/38 |
| | | | | 53/53 |
| 2007/0251804 A1 | 11/2007 | Hahnel et al. | | |
| 2010/0172724 A1* | 7/2010 | Hawkes | ................ | G16H 20/13 |
| | | | | 414/266 |
| 2015/0056046 A1 | 2/2015 | Haehnel et al. | | |

FOREIGN PATENT DOCUMENTS

| | | | | |
|---|---|---|---|---|
| DE | 202011110538 U1 * | 11/2014 | ............ | B65G 47/90 |
| EP | 0 842 878 A1 | 5/1998 | | |
| EP | 2 840 029 A1 | 2/2015 | | |
| WO | WO 2014/181307 A1 | 11/2014 | | |

\* cited by examiner

DEVICE AND METHOD FOR TRANSFERRING BLISTER PACKS

RELATED APPLICATIONS

This application claims priority to European Patent Application No. 18 168 647.8, filed on Apr. 23, 2018, entitled "Device And Method For Transferring Blister Packs", the the contents of which are incorporated herein by reference in their entirety.

FIELD

The present disclosure relates to a device and a method for transferring blister packs from a stamping station, a transport means, or an intermediate storage area to a conveying means or a storage area.

BACKGROUND

Blister packs are frequently used in the pharmaceutical industry for the packaging of medications. A plurality of pockets, into which products such as sugar-coated pills or tablets are introduced, are first formed in a film web. After the pockets have been filled, the film web is sealed with a lidding foil and then sent to a stamping station, in which the individual blister packs are stamped out from the film web.

In another phase of the packaging process, the stamped-out blister packs are transferred to a conveying means by the use of a transfer device. The blister packs are placed in individual receptacles of the conveying means to form stacks. Then the stacks of blister packs arranged on the conveying means are sent to a packaging station, where the stacks of blister packs are introduced into appropriate packaging such as folding boxes. The time which the transfer device requires to transfer blister packs from the stamping station to the conveying means logically has an influence on the throughput of the overall packaging machine.

BRIEF SUMMARY

The present disclosure provides an improved device and a method for transferring blister packs from a stamping station, a transport means, or an intermediate storage area to a conveying means or a storage area, wherein the transfer of the blister packs proceeds with an especially high degree of efficiency, precision, and speed.

According to an aspect of the present disclosure, the device for transferring blister packs comprises a first transfer unit for transferring blister packs from a stamping station, a transport means, or an intermediate storage area to an intermediate place element and a second transfer unit for transferring blister packs from the intermediate place element to a conveying means or a storage area. The second transfer unit comprises a suction arm, which can be moved between a picking position, in which it can pick several blister packs from several intermediate place positions on the intermediate place element, and a placing position, in which it can place the several blister packs in several final place positions on the conveying means or in the storage area. The suction arm comprises a first segment and a second segment, wherein the first segment of the suction arm is mounted so that it can rotate around an associated first axis. The first segment of the suction arm comprises a section to which the second segment is attached in such a way that it can rotate around a non-stationary second axis substantially perpendicular to the first axis. A suction device for drawing up and holding the blister packs is arranged on the second segment. The suction arm is configured and actuated in such a way that the movement of the suction arm from the picking position to the placing position and back is a combined movement, which consists at least of a first rotational movement of the first segment and of the second segment around the first axis and a second rotational movement of the second segment around the second axis. The suction arm is configured and actuated in such a way that the blister packs in the intermediate place positions are picked simultaneously from above by the suction device of the suction arm and also placed simultaneously from above in the final place positions. The several intermediate place positions are arranged next to each other in a row parallel to the first axis and jointly form an intermediate place position area. The several final place positions are arranged next to each other in a row parallel to the first axis and jointly form a final place position area.

This guarantees a reliable transfer of the blister packs, during which the blister packs are transferred to a multi-file conveying means or to a multi-file storage area in a simple manner and with high throughput.

In a first alternative, the second axis of the suction arm is arranged in such a way that, during the first rotational movement of the first segment of the suction arm, it moves in a plane which intersects the intermediate place position area and the final place position area along a straight line in each case, wherein the lines are arranged in the area of a center of the intermediate place positions area and a center of the final place position area. This provides a simple way of transferring the blister packs in multiple files in linear fashion.

In a second alternative, the second axis of the suction arm is arranged in such a way that, during the first rotational movement of the first segment of the suction arm, it moves in a plane which intersects the intermediate place position area or its lateral projection along a straight line, which is laterally offset from the center of the intermediate place position area. This provides a simple way to achieve a lateral offset of the several blister packs.

The second segment and thus the blister packs held on the suction device preferably execute a rotational movement around the second axis of substantially 180° when the suction arm moves from the picking position to the placing position or vice versa. This rotational movement provides an easy way of rotating the blister packs 180° around their centers during the transfer. This guarantees in turn that the blister packs can be placed with their lidding foil sides facing up.

It is also preferred that the first segment execute a rotational movement around the first axis of 120-180° when the suction arm moves from the picking position to the placing position or vice versa. It is conceivable that the suction device could project at a certain angle from the second segment of the suction arm, which means that the angle around which the first segment must pivot can be less than the angle of 180°, i.e., the angle which the blister packs must travel as they move from the intermediate place positions to the final place positions.

So that it can be adapted to blister packs of different formats, the suction arm can be supported so that it can be shifted in a direction parallel to the first axis.

It is preferred that the suction device comprise several suction heads, which are attached to the second segment by means of at least one support arm. It is especially preferred that the at least one support arm be attached rigidly to the second segment.

To reduce the angle around which the first segment must rotate, the at least one support arm, when in the picking and placing positions, can project downward at slant from the second segment.

The method according to the present disclosure for transferring blister packs from a stamping station, a transport means, or an intermediate storage area to an intermediate place element and from the intermediate place element to a conveying means or a storage area by means of a device comprises the following steps:

transferring several blister packs from the stamping station, the transport means, or the intermediate storage area to the intermediate place element, wherein the blister packs are placed on the intermediate place element next to each other in a row in several intermediate place positions; and picking the several blister packs in the several intermediate place positions from the intermediate place element, moving the blister packs, and placing the blister packs in several final place positions on the conveying means or in the storage area, wherein the blister packs are arranged in the final place positions next to each other in a row parallel to the row of blister packs in the intermediate place positions.

The blister packs in the intermediate place positions are picked simultaneously from above and also placed simultaneously from above in the final place positions on the conveying means or in the storage area; and after the blister packs have been placed in the final storage positions, they have the same side facing up as they did when in the intermediate place positions but now with a rotation of 180° around their centers.

This guarantees a reliable transfer of blister packs, during which the blister packs are transferred to a multi-file conveying means or to a multi-file storage area in a simple manner and with high throughput.

The blister packs are picked from the intermediate storage element, moved, and placed on the conveying means or in the storage area preferably by means of a suction arm, which executes a back-and-forth pivoting movement. As a result, the blister packs are treated gently and are transferred with high throughput.

According to a preferred embodiment, in the case of an even number of blister packs, the final place positions of all of the blister packs are exchanged in comparison to their intermediate place positions; or, in the case of an odd number of blister packs, the final place positions of all of the blister packs except for the blister pack in the middle are exchanged in comparison to the intermediate place positions.

In a preferred embodiment, the transfer of the blister packs from the stamping station, the transport means, or the intermediate storage area to the intermediate place element comprises the steps of picking the several blister packs from several ready positions of the stamping station, the transport means, or the intermediate storage area; moving the blister packs; and placing the blister packs in the intermediate place positions of the intermediate place element; wherein the blister packs in the ready positions are picked from above and also placed from above in the intermediate place positions on the intermediate place element.

The blister packs are preferably arranged in the ready positions next to each other in a row parallel to the rows of blister packs in the intermediate place positions and in the final place positions; and after the blister packs have been placed in the intermediate place positions, they have the same side facing up as they did when in the intermediate place positions but now with a rotation of 180° around their centers.

It is preferred that the blister packs be transferred simultaneously from the stamping station, the transport means, or the intermediate storage area to the intermediate place element.

The blister packs in the intermediate place positions and in the final place positions are preferably arranged with the lidding foil facing up It is also preferable for the blister packs in the ready positions to have their lidding foil facing up.

DETAILED DESCRIPTION

Figure 1:
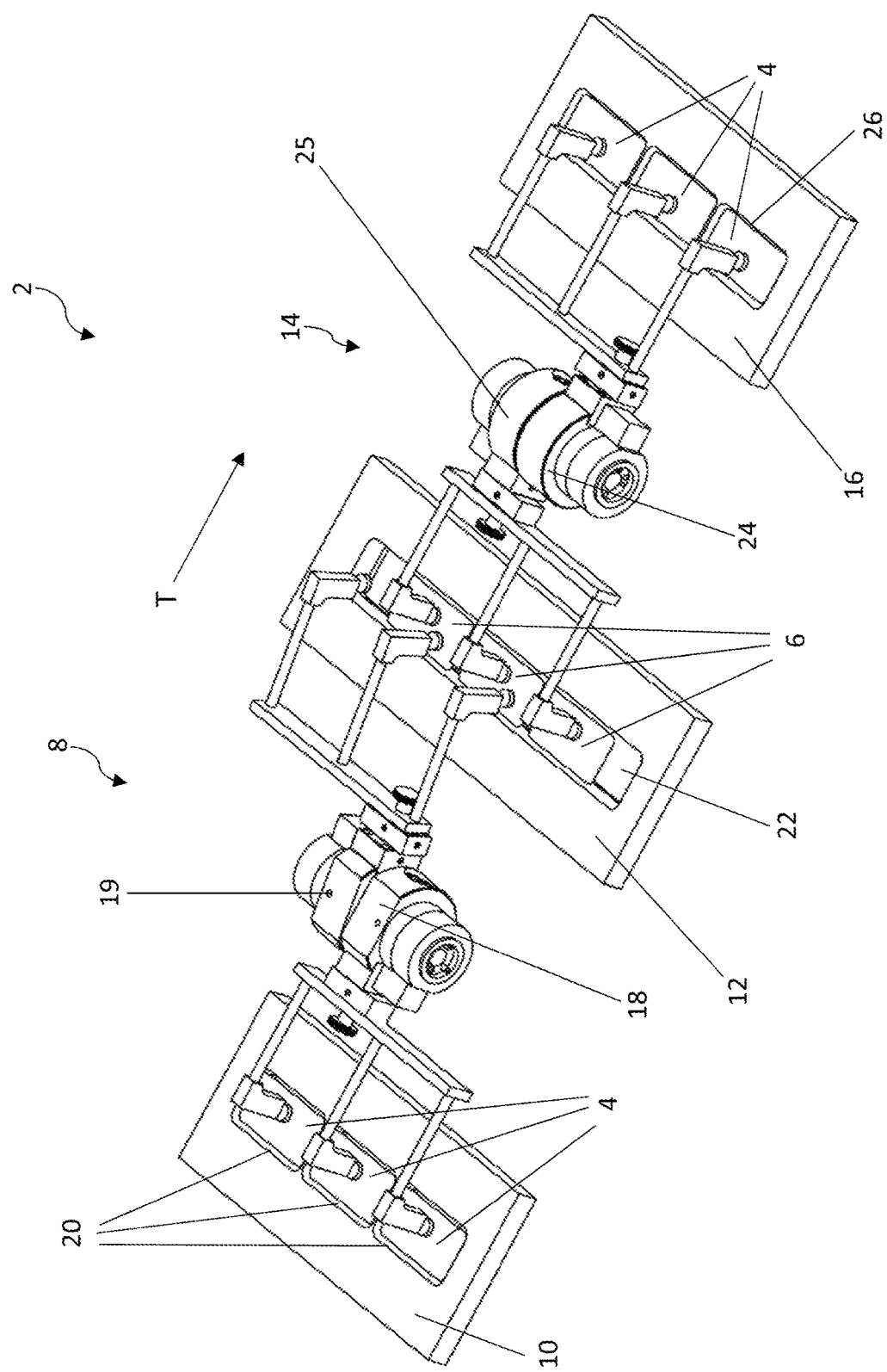
FIG. 1 is a schematic diagram, in perspective, of a device according to the present disclosure for transferring blister packs.

FIGS. 1-6 show a device 2 according to the present disclosure for transferring blister packs 4, 6. In FIG. 1 and FIGS. 3-6, the device 2 for transferring blister packs 4, 6 is shown in various stages of the transfer process. FIGS. 2a and 2b are top view of the device 2.

The device 2 for transferring blister packs 4, 6 comprises a first transfer unit 8, which transfers the blister packs 4, 6 from a stamping station 10 to an intermediate place element 12, and a second transfer unit 14, which transfers the blister packs 4, 6 from the intermediate place element 12 to a conveying means 16. The transfer direction of the blister packs 4, 6 is indicated in the figures by the arrow T.

The stamping station 10, the intermediate place element 12, and the conveying means 16 are illustrated in the figures only schematically. In the area of the stamping station 10, the blister packs 4, 6 are usually provided immediately after the stamping operation. It is also possible, however, for a transport means (not shown) to be provided in the output area of the stamping station 10; after the stamping operation, this transport means would then transport the blister packs 4, 6 onward until they can be gripped by the first transfer unit 8. A transport means of this type preferably moves in a stepwise manner in the transfer direction T. Finally, it is also possible that, after the stamping operation, the blister packs 4, 6 could be stored initially in an intermediate storage area (not shown), from which the transfer unit 8 would then removes the blister packs 4, 6 located above or in front of it.

The conveying means 16 preferably moves in the transfer direction T. The conveying means 16 can be configured an endless packaging-goods chain, which moves either continuously or in a stepwise manner. It is also conceivable that the conveying means 16 could be configured as a linear motor system. If the conveying means 16 is moved in stepwise fashion or if the individual slides of the endless linear motor system stand still when in the position where they are supplied with the blister packs 4, 6, stacks of two or more blister packs 4, 6, one lying on top of the other, can be formed in the compartments of the conveying means 16. It is also conceivable that the blister packs 4, 6 could be transferred initially to a storage area (not shown) rather than directly to the conveying means 16.

The first transfer unit 8 comprises a first suction arm 18 and a second suction arm 19. The first suction arm 18 and the second suction arm 19 are arranged next to each other in a row transverse to the transfer direction T (see FIG. 2a). The first suction arm 18 can be moved between a picking position, shown in FIG. 2b, in which it can pick first blister packs 4 from ready positions 20 in the stamping station 10, and a placing position (FIG. 2a), in which it can place the first blister packs 4 in intermediate place positions 22 on the intermediate place element 12.

Figure 2A:
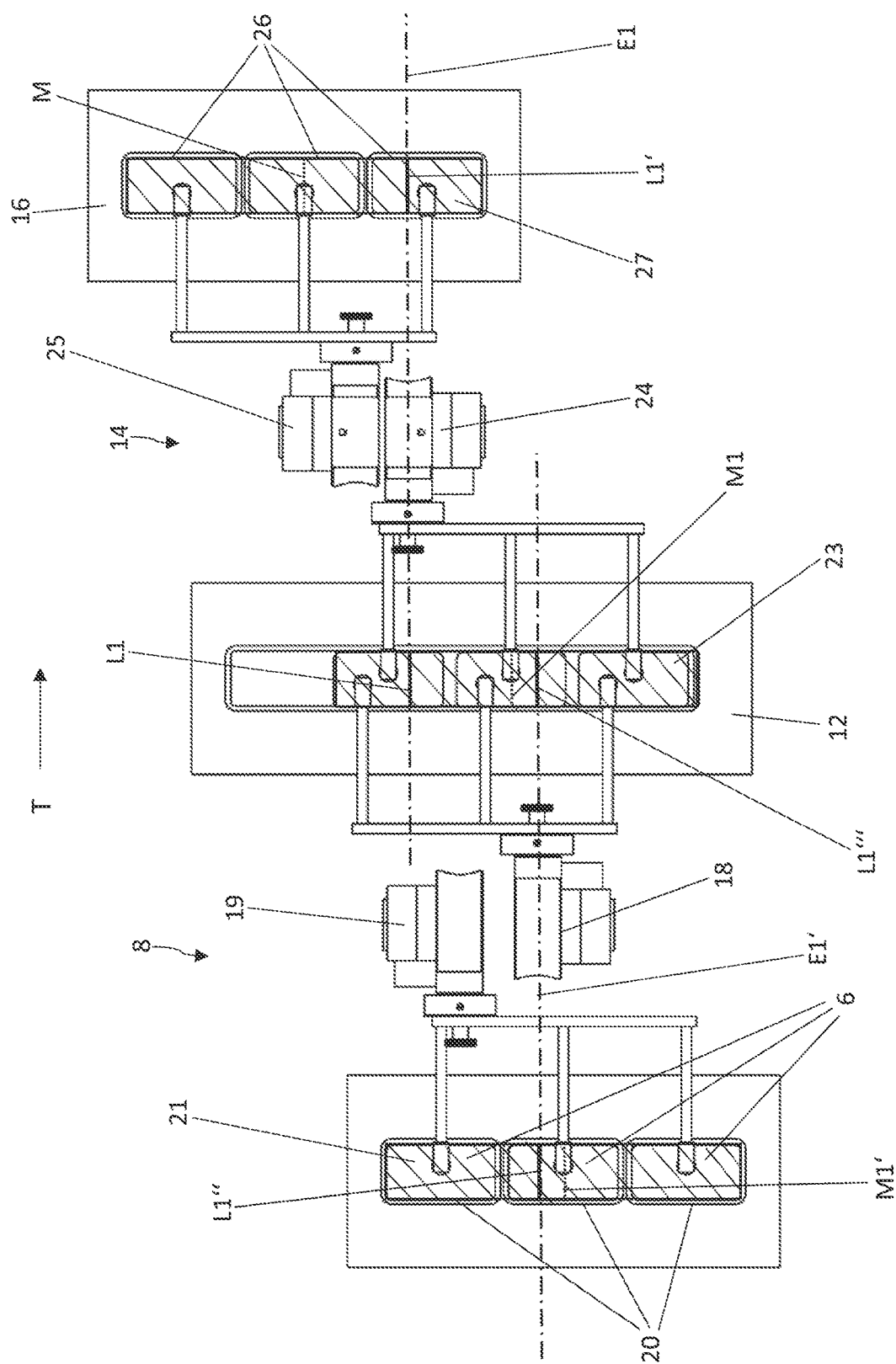
FIGS. 2a and 2b are top views of the device of FIG. 1 in various stages of the transfer process.
Figure 2B:
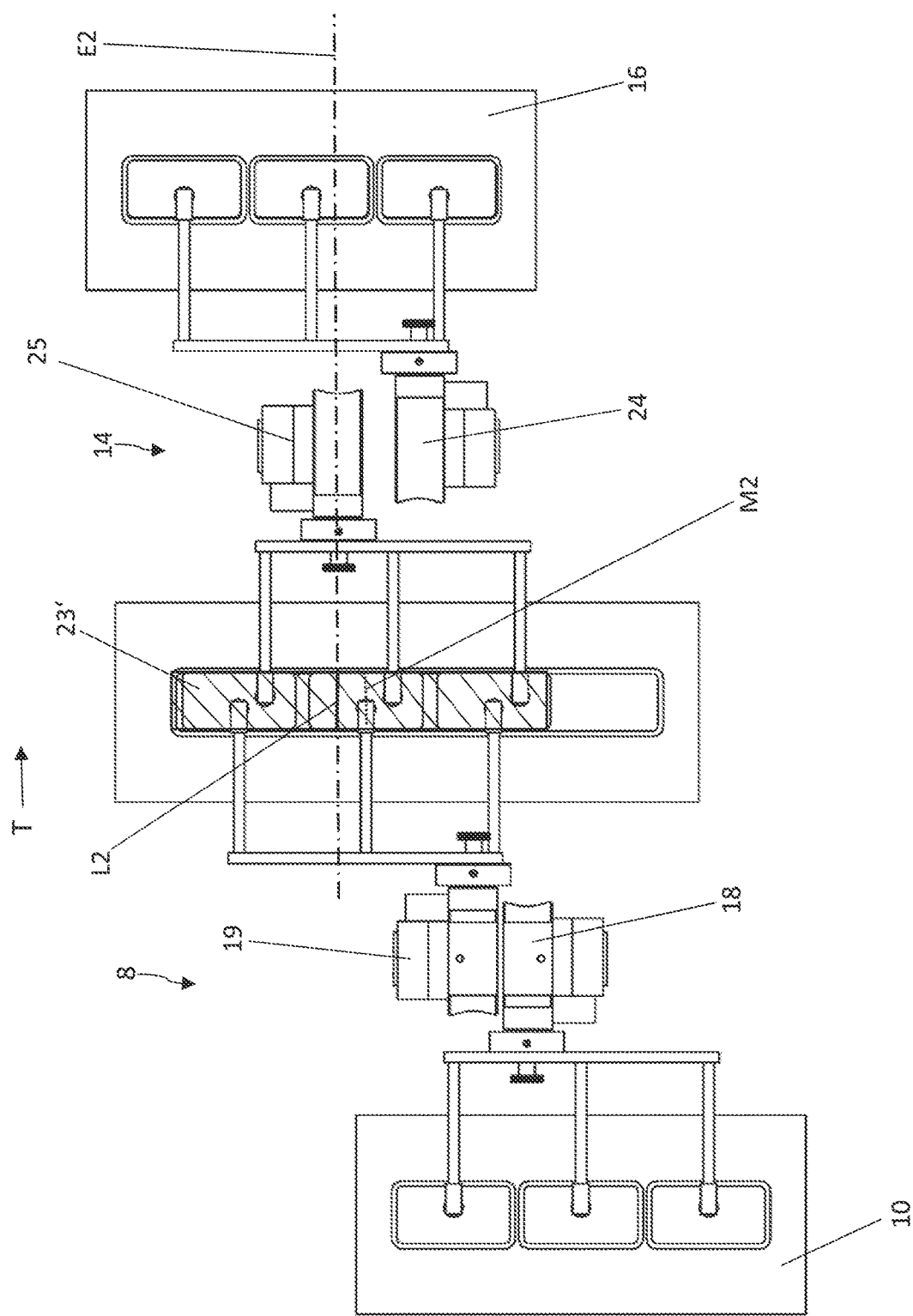

The second suction arm 19 can also be moved between a picking position, in which it can pick second blister packs 6 from the ready positions 20 (see FIG. 2a), and a placing position, in which it can place the second blister packs 6 in the intermediate place positions 22 on the intermediate place element 12 (FIG. 2b).

In the preferred embodiment shown here, the suction arms 18, 19 are actuated in such a way that they move from their picking positions to their placing positions and back again in opposite directions. Each suction arm 18, 19 can transfer several blister packs 4, 6 simultaneously. Thus the blister packs 4, 6 in the ready positions 20 in the stamping station 10 are gripped simultaneously by the first transfer unit 8 and also placed simultaneously in the intermediate place positions 22 on the intermediate place element 12. In addition to the embodiment shown here, there are also many other possible ways of configuring the first transfer unit 8. For example, it is conceivable that the blister packs 4, 6 could be transferred by means of a single suction arm. It is also conceivable that, instead of the suction arms 18, 19, gripper devices could be used. Finally, it is also possible that a transfer unit 8 of a different configuration could transfer the blister packs 4, 6 in time-shifted fashion rather than simultaneously.

The second transfer unit 14 comprises a first suction arm 24 and a second suction arm 25, which are arranged next to each other in a row transverse to the transfer direction T. The first suction arm 24 can be moved between a picking position (see FIG. 2a), in which it can pick the blister packs 4 from the intermediate place positions 22 on the intermediate place element 12, and a placing position (see FIG. 2b), in which it can place the first blister packs 4 in final place positions 26 on the conveying means 16.

The second suction arm 25 of the second transfer unit 14 can be moved between a picking position (see FIG. 2b), in which it can pick the second blister packs 6 from the intermediate place positions 22 on the intermediate place element 12, and a placing position (see FIG. 2a), in which it can place the second blister packs 6 in the same final place positions 26 in which the first suction arm 24 places the first blister packs 4.

The two suction arms 24, 25, aside from the attachment points of their suction devices 34, are arranged and configured in mirror-symmetric fashion to the longitudinal center plane of the transfer unit 14. The two suction arms 24, 25 execute opposite back-and-forth pivoting movements. When the first suction arm 24 is in the picking position, the second suction arm 25 is in its placing position or at least near its placing position. When the first suction arm 24 is in the placing position, the second suction arm 25 is in its picking position or at least near its picking position. The picking position of the first suction arm 24 differs in terms of its physical configuration in space from the picking position of the second suction arm 25. The placing position of the first suction arm 24 also differs from the placing position of the second suction arm 25.

The ready positions 20 in the stamping station 10, the intermediate place positions 22 on the intermediate place element 12, and the final place positions 26 on the conveying means 16 are in each case preferably configured to accommodate the shape of the blister packs 4, 6 to be transferred. For conventional blister packs 4, 6, the cited positions will thus comprise a substantially rectangular shape. In the embodiment shown here, the above-cited positions are each arranged in such a way that the longer sides of the positions are transverse to the transfer direction T. As can be seen in FIG. 2a, the intermediate place positions 22 are arranged in a row parallel to the row of ready positions 20, and the final place positions 26 are arranged in a row parallel to the row of intermediate place positions 22. All of the rows are parallel to the first axis A1 of the suction arms 24, 25 (see FIG. 7). In each case, the blister packs 4, 6 acquire a lateral offset transverse to the transfer direction T as they travel between the ready positions 20 and the intermediate place positions 22 and between the intermediate place positions 22 and the final place positions 26. The ready positions 20 form a ready position area 21 (shown with shading in FIG. 2a). The intermediate place positions 22 for the first suction arm 24 form together an intermediate place position area 23 (shown with shading in FIG. 2a), and the intermediate place positions 22 for the second suction arm 25 form together an intermediate place area 23' (shown with shading in FIG. 2b). The final place positions 26 form together a final place position area 27 (shaded in FIG. 2a). Whereas the ready position area 21 is the same for both suction arms 18, 19, the intermediate place position area 23 of the first suction arm 18 is laterally offset from the intermediate place position area 23' of the second suction arm 19. The suction arms 24, 25 then pick the blister packs 4, 6 from the intermediate place position areas 23 and 23', respectively, and place them on the same final place position area 27.

Details of the second transfer unit 14 will now be described with reference to FIGS. 7-10. As can be seen from FIG. 7, the first suction arm 24 comprises a first segment 30 and a second segment 31. The first segment 30 of the first suction arm 24 is mounted so that it can rotate around a first axis A1, which is perpendicular to the longitudinal center plane L. The first segment 30 of the first suction arm 24 comprises a section to which the second segment 31 is attached in such a way that it can rotate around a non-stationary second axis A2, which is substantially perpendicular to the first axis A1. A suction device 34 for drawing up and holding the blister packs 4 is arranged on the second segment 31.

The second suction arm 25 also comprises a first segment 32 and a second segment 33. The first segment 32 of the second suction arm 25 is mounted in such a way that it can rotate around the same first axis A1. The first segment 32 of the second suction arm 25 also comprises a section to which the second segment 33 is attached in such a way that it can rotate around another, non-stationary second axis A2', which is substantially perpendicular to the first axis A1. A suction device 34 for drawing and holding blister packs 6 is also arranged on the second segment 33.

The suction arms 24, 25 are configured and actuated in such a way that the movement of the suction arms 24, 25 from the associated picking position to their associated placing position and back is a combined movement, which consists at least of a first rotational movement of the first segment 30, 32 and of the second segment 31, 33 around the first axis A1 and a second rotational movement of the second segment 31, 33 around the associated second axis A2, A2'.

As can be derived from FIG. 2a, the second axis A2 of the first suction arm 24 is arranged in such a way that, during the first rotational movement around the first axis A1, it moves in a first plane E1, which intersects the intermediate place position area 23 or its lateral projection along a first straight line L1. This first straight line L1 is laterally offset from the center M1 of the intermediate place position area 23. The plane E1 also intersects the final place position area 27 or its lateral projection along a straight line L1, which is laterally offset from the center M of the final place position area 27.

The second axis A2' of the second suction arm 25 is arranged in such a way that, during the first rotational movement of the second suction arm 25 around the first axis A1, it moves in a second plane E2 (FIG. 2b), which intersects the intermediate place position area 23' or its lateral projection along a second straight line L2, which is laterally offset from the center M2 of the intermediate place position area 23'. The plane E2 also intersects the final place position area 27 or its lateral projection along a straight line (not shown), which is laterally offset from the center M of the final place position area 27.

The second axis A2 of the first suction arm 18 of the first transfer unit 8 is also arranged in such a way that, during the first rotational movement of the first suction arm 18 around the first axis A1, it moves in a plane E1' (FIG. 2a), which intersects the intermediate place position area 23 or its lateral projection along a straight line L1''', which is laterally offset from the center M1 of the intermediate place position area 23. The plane E1' also intersects the ready positions area 21 or its lateral projection along a straight line L1'', which is laterally offset from the center M1' of the ready position area 21 (FIG. 2a).

Finally, the second axis A2 of the second suction arm 19 of the first transfer unit 8 is arranged in such a way that, during the first rotational movement of the second suction arm 19 around the first axis A1, it moves in plane (not shown) which intersects the intermediate place position area 23' or its lateral projection along a straight line (not shown), which is laterally offset from the center M2 of the intermediate place position area 23'. This plane also intersects the ready position area 21 or its lateral projection along a straight line (not shown), which is laterally offset from the center M1' of the ready position area 21.

Figure 7:
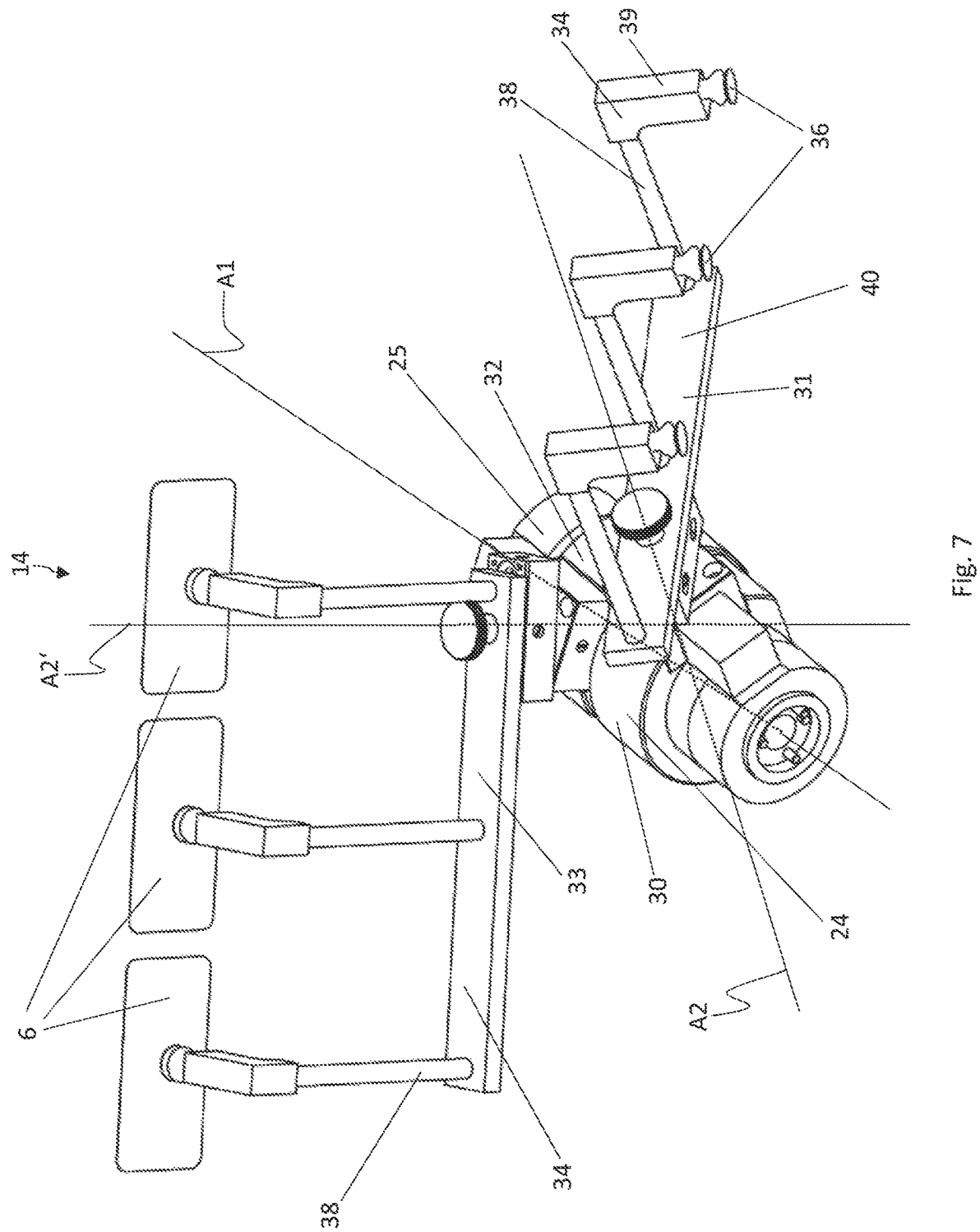
FIG. 7 is a schematic diagram, in perspective, of two suction arms, which are used in the second transfer unit of the device according to FIG. 1.

As can be seen in FIG. 7, the suction device 34 of each suction arm 24, 25 comprises several suction heads 36, which are attached to the second segment 31, 33 by means of a support arm 38. At least one suction head 36 is provided for each blister pack 4, 6. Several separate support arms 38 for connection to the second segment 31, 33 can also be present. In the embodiment shown here, the support arm 38 is configured as a rake and comprises several fingers 39, on the tip of each one a suction head 36 is arranged. The support arm 38 is preferably attached rigidly to the second segment 31, 33. In the embodiment shown, the fingers 39 of the support arm 38 project perpendicularly from a common connecting strut 40. The connecting strut 40 is connected in turn to the second segment 31, 33 by means of a connecting member 42, which is perpendicular to the strut. In the embodiment shown, the connecting member 42 of the support arm 38 is connected perpendicularly to the second segment 31, 33. It is also conceivable that the connecting member 42 and thus the support arm 38 could project at a slant from the second segment 31, 33. In the associated picking and placing positions of the suction arms 24, 25, the connecting member 42 and thus the support 38 would then project downward at slant. In this way, it would be possible to reduce the angle around which the suction arm 24, 25 in question is required to travel around the first axis A1.

As can be derived from FIGS. 2a and 7, the second segment 31, 33 of the first or second suction arm 24 25, when in the associated picking position, is pivoted in first direction relative to the longitudinal center plane of the transfer unit 14. In concrete terms, the section of the second segment 31, 33 to which the support arm 38 is attached is pivoted in the first direction. It can also be seen that the second segment 31, 33 of the first or second suction arm 24, 25—in concrete terms, the section of the second segment 31, 33 to which the support arm 38 is attached—is, when in the associated placing position, pivoted in a second direction opposite the first direction, relative to the longitudinal center plane of the transfer unit 14.

Details of a possible drive for the suction arm 24 will be now be described with reference to FIGS. 8-10.

Figure 8:
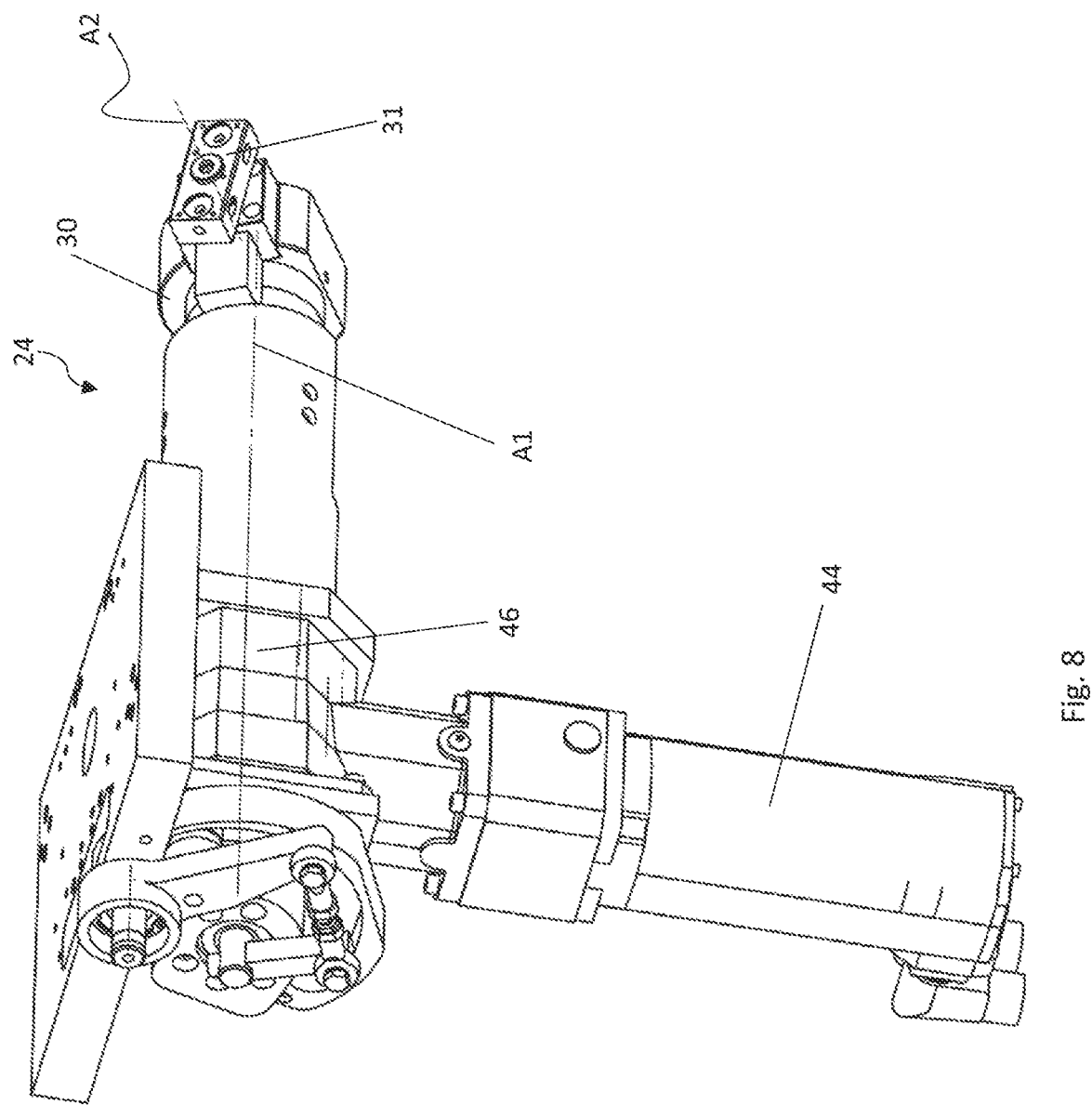
FIG. 8 is a schematic diagram, in perspective, of essential drive components of a suction arm according to FIG. 7.

In FIG. 8 a motor 44 can be seen, which pivots the first segment 30 back and forth around the first axis A1 by way of a gear unit 46. The second segment 31, which can pivot around the second axis A2, is shown without the suction device 34 attached to it. The suction device 34 is preferably a format-dependent part, which can be exchanged as a function of the type and size of the blister packs 4, 6 to be transferred. So that the support arm 38 of the suction device 34 can be attached to, and detached from, the second segment 31, a knurled screw 48 (see FIG. 9) is provided. So that the device can be further adapted to different formats, the suction arms 24, 25 can be supported so that they can be shifted in a direction parallel to the first axis A1 and/or in the longitudinal direction.

Figure 9:
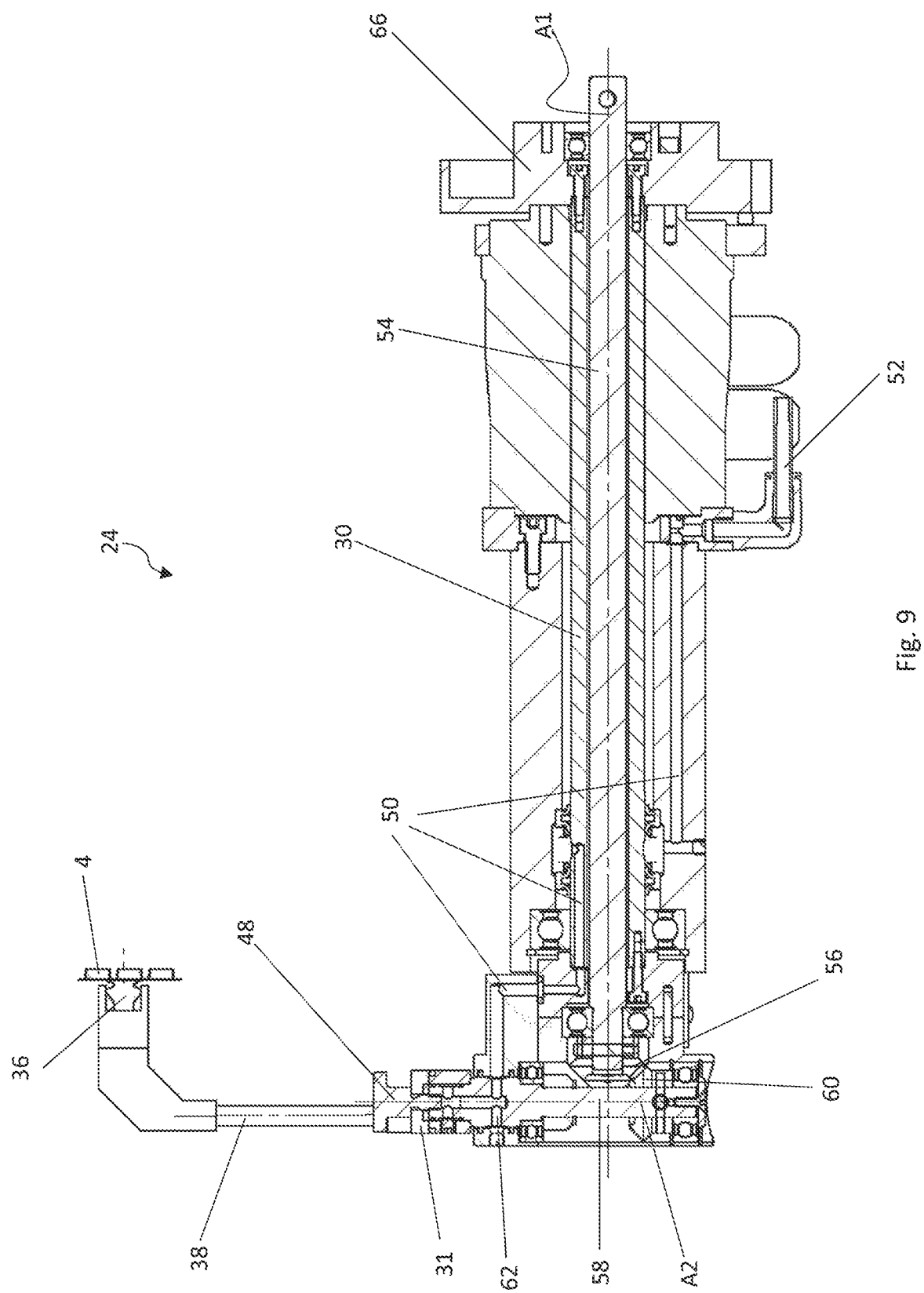
FIG. 9 is a cross-sectional view, illustrating the internal structure of a suction arm according to FIG. 7.
Figure 10:
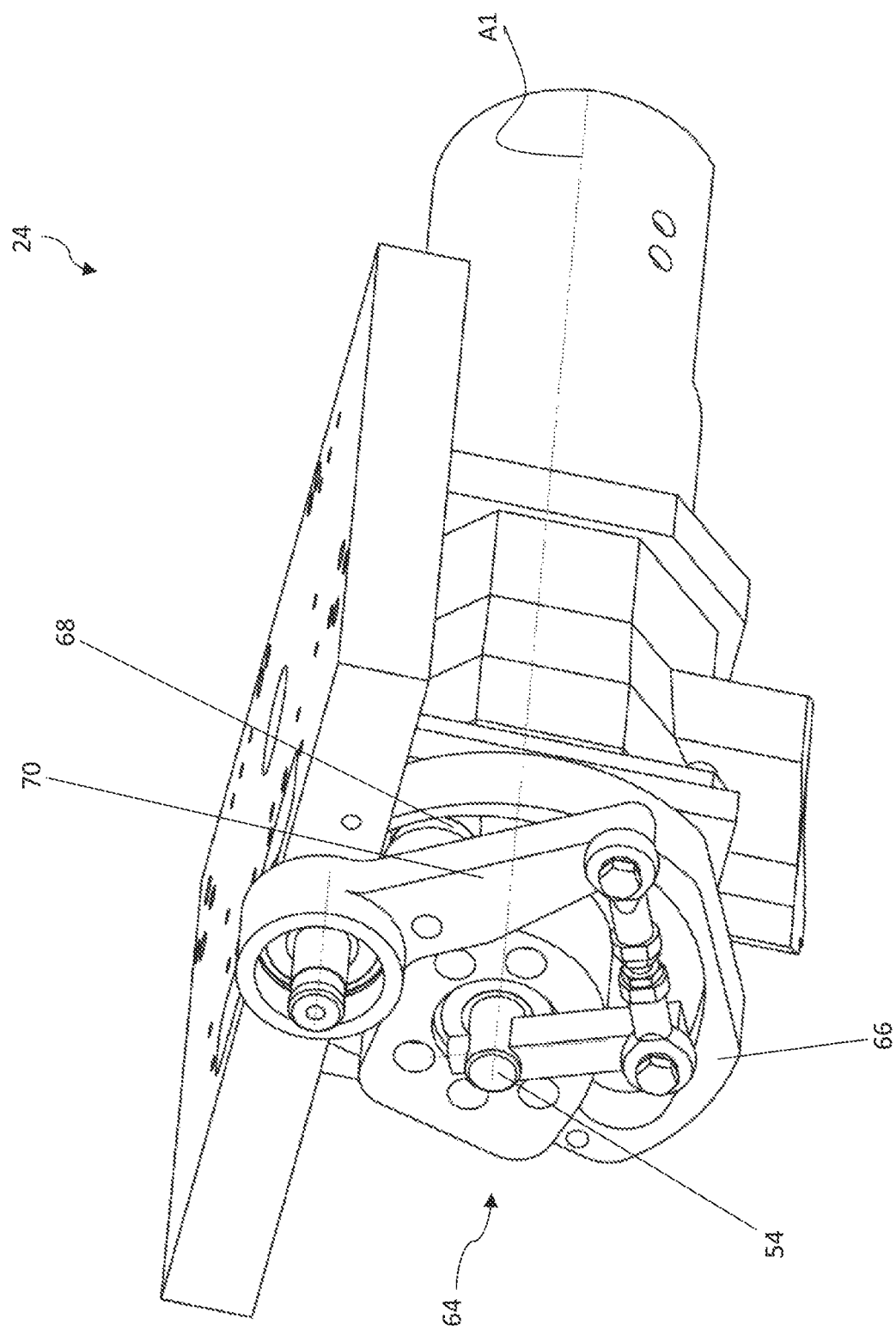
FIG. 10 is a schematic diagram, in perspective, of a mechanism for adapting the rotational movement of the second segment of the suction arm of FIG. 9 around the second axis.
Figure 11:
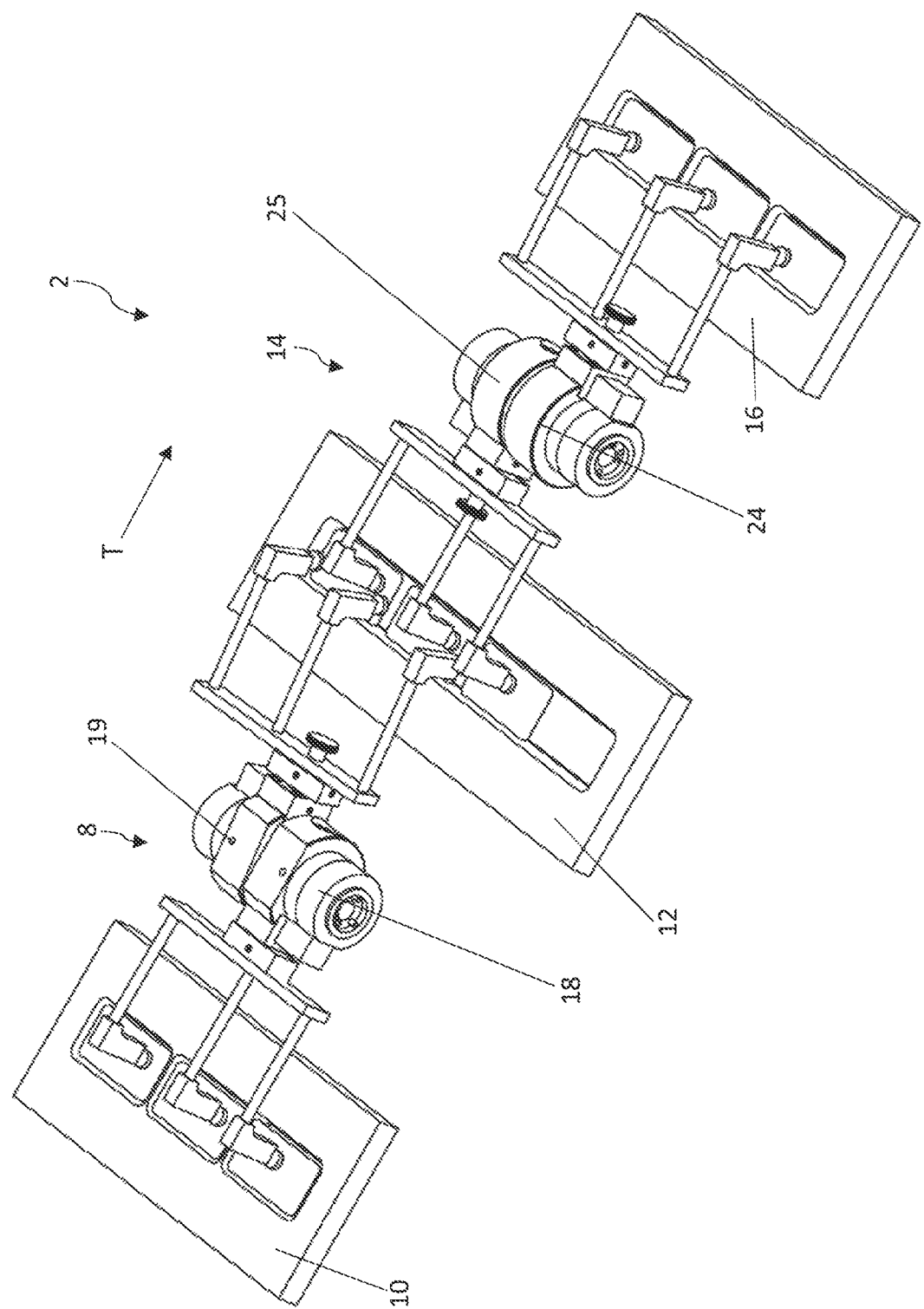
FIG. 11 is a schematic diagram, in perspective, of a variant of the device according to the present disclosure.

In the cross-sectional view according to FIG. 9, the motor 44 and the gear unit 46 are not shown. The first segment 30 of the suction arm 24, which is configured as a hollow shaft, is driven by the motor 44. When the motor 44 is actuated, the first segment 30 is pivoted back and forth around the first axis A1. The second segment 31 is supported on a section of the first segment 30 so that it can rotate around the second axis A2. In the first segment 30, air channels 50 are present, which are connected to a vacuum connection 52 for the suction heads 36. In the interior of the first segment 30, furthermore, a shaft 54 is arranged, to one end of which, namely, the end facing the second segment 31, a bevel gear 56 is rigidly attached.

The second segment 31 comprises a central shaft 58, which is supported so that it can rotate in the end section of the first segment 30, and which turns along with the first segment 30 when the first segment 30 turns around the first axis A1. Rigidly attached to the shaft 58 is another bevel gear 60, which meshes with the bevel gear 56 when the first and second segments 31, 31 rotate around the first axis A1. An annular groove 62 in the shaft 58 serves to produce a connection with the air channels 60 in the first segment 30 even during a rotational movement of the second segment 34 around the second axis A2.

When the first segment 30 and thus also the second segment 31 are pivoted around the first axis A1, the bevel gear 60 travels over the unmoving bevel gear 56 and thus causes the shaft 58 to rotate around the second axis A2. For a ratio of 1:1 between the bevel gears 56, 60, therefore, a pivoting of the first segment 30 and of the second segment 31 around the first axis A1 by 180°, as is desired for the transfer processes shown in FIGS. 1-6, brings with it a rotation of the second segment 31 around the second axis A2 by 180° as well. Thus the second segment 31 and the blister packs 4 held by the suction device 34 execute a rotational movement around the second axis A2 of substantially 180° when the suction arm 24 moves from its picking position to its placing position or vice versa. If the suction device 34 projects downward at a angle when in the picking position and in the placing position, the first segment 30 can travel around an angle of less than 180°, possibly as little as 120°, during the pivoting movement around the first axis A1. In this case, it would be necessary to adapt the ratio between the bevel gears 56, 60 accordingly, because the second segment 31 must in all cases complete a rotational movement of 180° around the second axis A2.

The rotational movement of the second segment 31 around the second axis A2 in combination with the pivoting movement around the first axis A1 has the effect that the blister packs 4 can be gripped by the suction heads 36, which preferably act on the flat surface of the lidding foil, and can then be placed from above in the final place positions 26. As this is happening, the blister packs 4 complete a 180° rotation around their centers.

In a departure from the previously described basic principle, it is desirable for the second segment 31 not to rotate around the second axis A2 during the end phases of the pivoting movement around the first axis A1. This reason for this is that, for the effective picking and placing of the blister packs 4, it is advantageous for the blister packs 4 to be the raised and lowered in a straight line during the end phases of the movement. To achieve this purpose, a mechanism 64 for adapting the course of the rotation of the second segment around the second axis A2 can be provided in the second transfer unit 14.

This mechanism 64 will now be described in greater detail with reference to FIG. 10. In FIG. 10, the end of the first segment 30, i.e., the end to which the second segment 31 and the suction device 34 are attached, is not shown for the sake of clarity. The mechanism 64 comprises a cam disk 66, which rotates around the first axis A1 jointly with the first segment 30. The cross-sectional view in FIG. 9 also shows this cam disk 66 but without the additional components of the mechanism 64.

Again with reference to FIG. 10, the mechanism 64 also comprises a cam roller 68, which is articulated rotatably to a lever mechanism 70. The lever mechanism 70 is rigidly connected in turn to the internal shaft 54, to the other end of which the bevel gear 68 is attached. When the cam disk 66 rotates around the first axis A1, the cam roller 68 runs along the cam disk 66 and thus brings about a corresponding deflection of the lever mechanism 70, which leads in turn to a rotation of the shaft 54 around the first axis A1. The mechanism 64 is configured in such a way that, during the initial and final phases of the rotational movement of the first segment 30 and thus of the cam disk 66 around the first axis A1, the shaft 54 and thus the bevel gear 56 move along at the same angular velocity as the first segment 30. As a result, there is no relative movement between the bevel gear 56 and the bevel gear 60, which also means that there is no rotational movement of the second segment 31 around the second axis A2.

Over the further course of the pivoting movement around the first axis A1, however, the mechanism 64 brings about an opposing movement of the shaft 54, opposite to the rotational direction of the first segment 30, as a result of which the rotational speed of the second segment 31 around the second axis A2 is faster, in certain phases, than the rotational movement around the first axis A1. It is thus possible to suspend the rotational movement of the second segment 31 around the second axis A2 at the end points of the pivoting movement around the first axis A1, and to compensate for this again in a middle phase of the pivoting movement around the first axis A1 by the more rapid rotation of the second segment 31 around the second axis A2. This guarantees that the blister packs 4 will always complete a rotational movement of 180° around the second axis A2.

There are obviously many different modifications which can be made to the structure of the suction arms 24 and to the associated drive described so far. Thus, for example, the coupling between the pivoting movement of the first segment 30 around the first axis A1 and the rotational movement of the second segment 31 around the second axis A2 can also be achieved by other mechanical components. In addition, it is conceivable that two separate servo motors could be provided, one for the drive of the first segment 30 and one for the drive of the second segment 31.

The structure of the suction arm 25 is mirror-symmetric to that of the suction arm 24, wherein the first segment carries the designation 32, the second segment the designation 33, and the second axis the designation A2'.

The sequence of steps of the transfer process with the above-described device 2 will now be explained in greater detail with reference to FIGS. 1-6. The blister packs 4, 6 are picked from the ready positions 20 in the stamping station 10 by the first and second suction arms 18, 19 of the first transfer unit 8, moved to the intermediate place positions 22, and placed there. The blister packs 4, 6 are preferably picked from above from the ready positions 20 by the first transfer unit 8 and also placed from above in the intermediate place positions 22 of the intermediate place element 12.

Because of the combined rotational movements around the two axes, which are perpendicular to each other, the blister packs 4, 6, which are arranged in the ready positions 20 in a transverse row, are placed in the intermediate place positions 22 with the same side facing up as in the ready positions 20, but now with a rotation of 180° around their centers. If desired, it is also possible that the blister packs 4, 6 in the ready positions 20 could be oriented vertically or at a certain angle to the vertical instead of horizontally. In this case, the suction arms 18, 19 would only have to pivot around the first axis by an angle of less than 180°, usually by an angle in the range of 60-180°.

Figure 3:
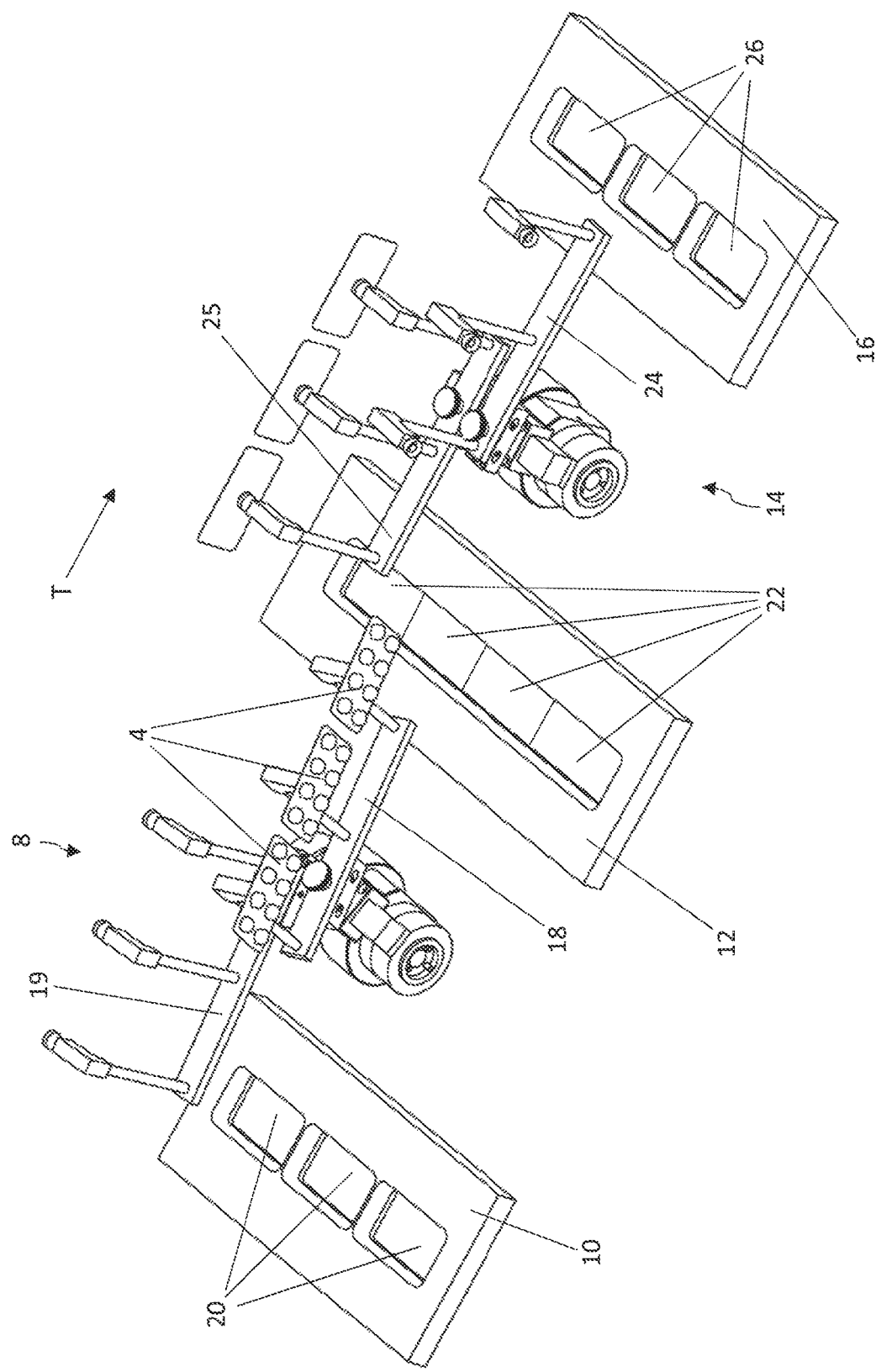
FIGS. 3-6 are schematic diagrams, in perspective, of the device of FIG. 1, showing various stages of the transfer process.
Figure 4:
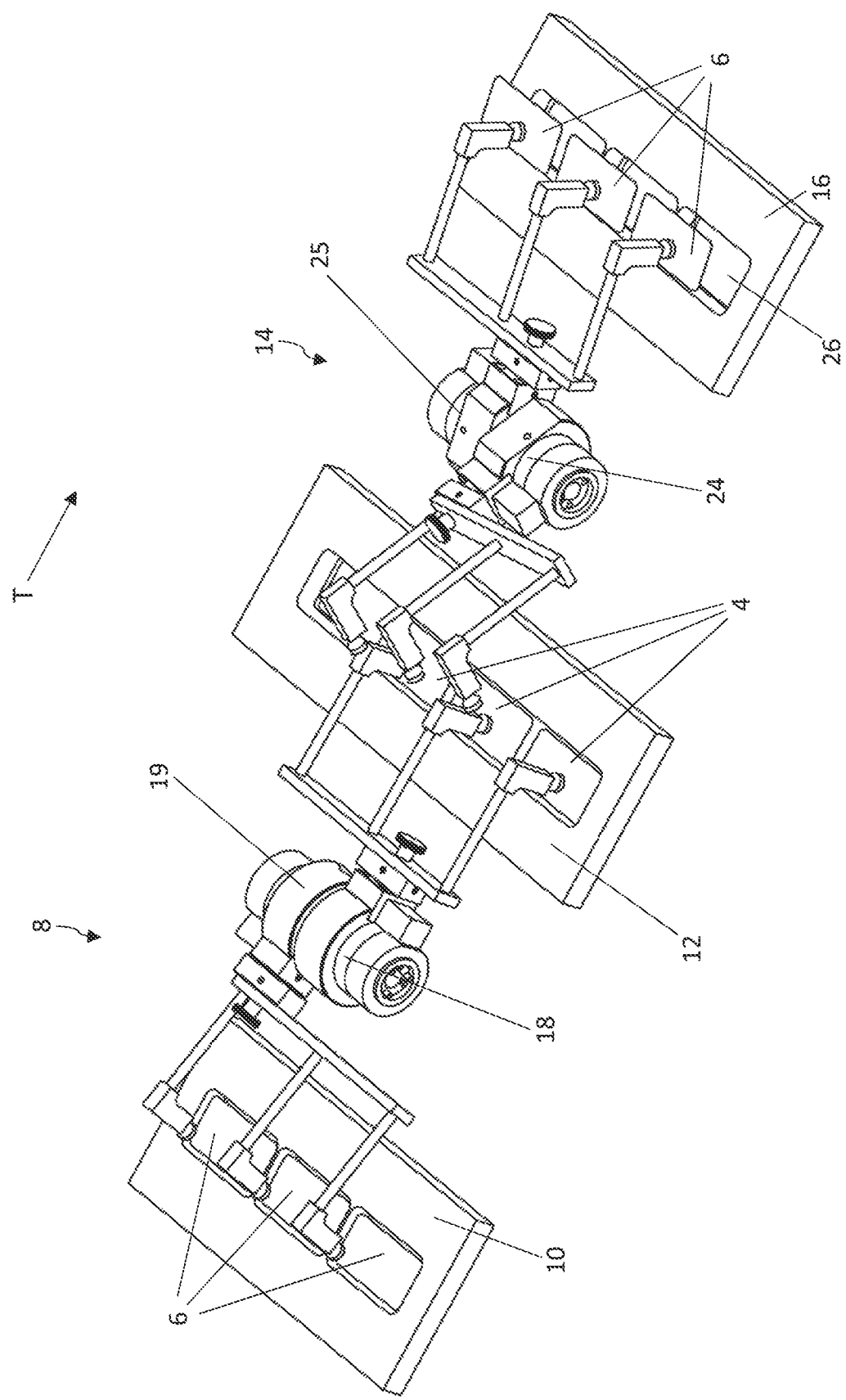
Figure 5:
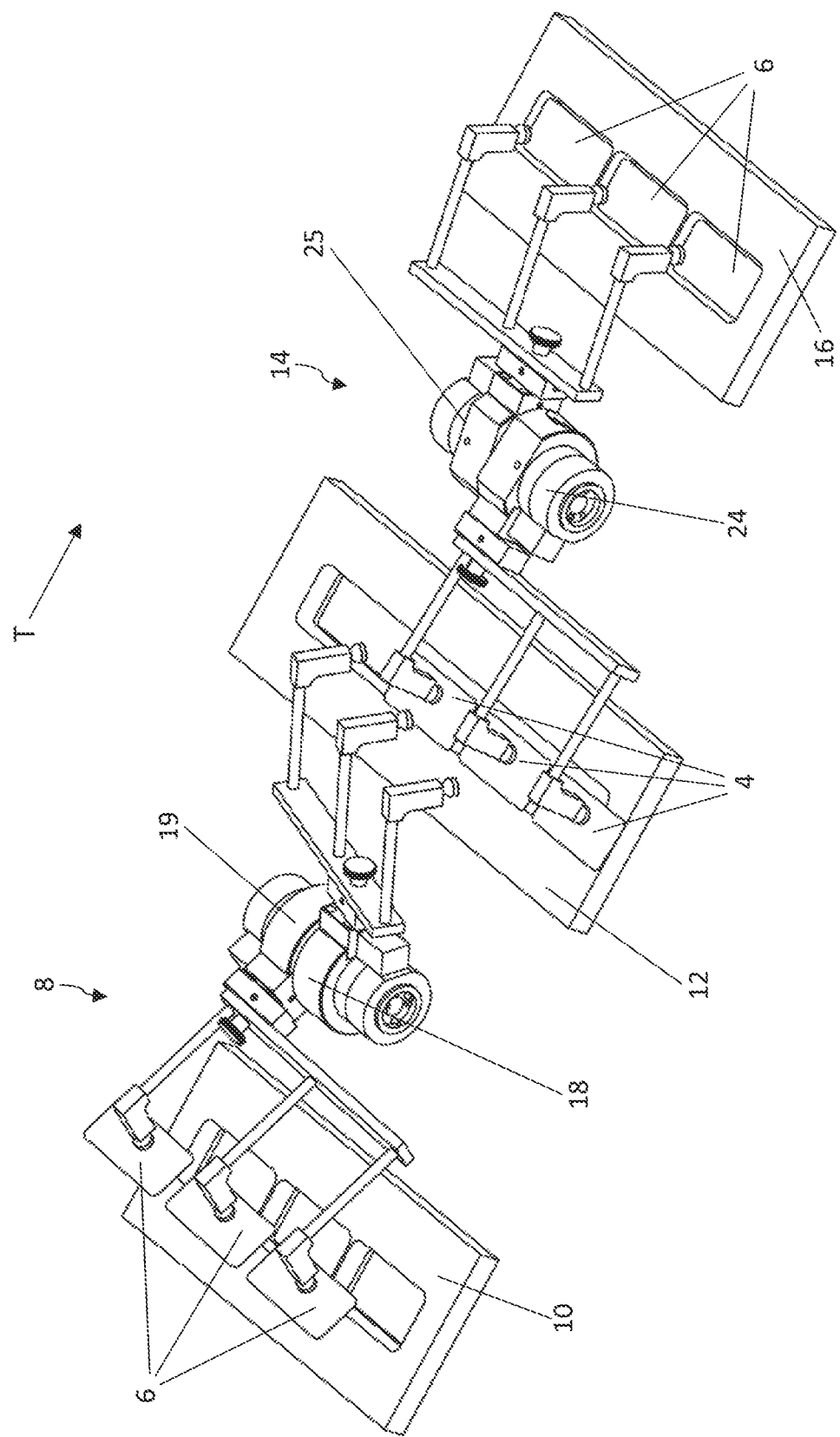
Figure 6:
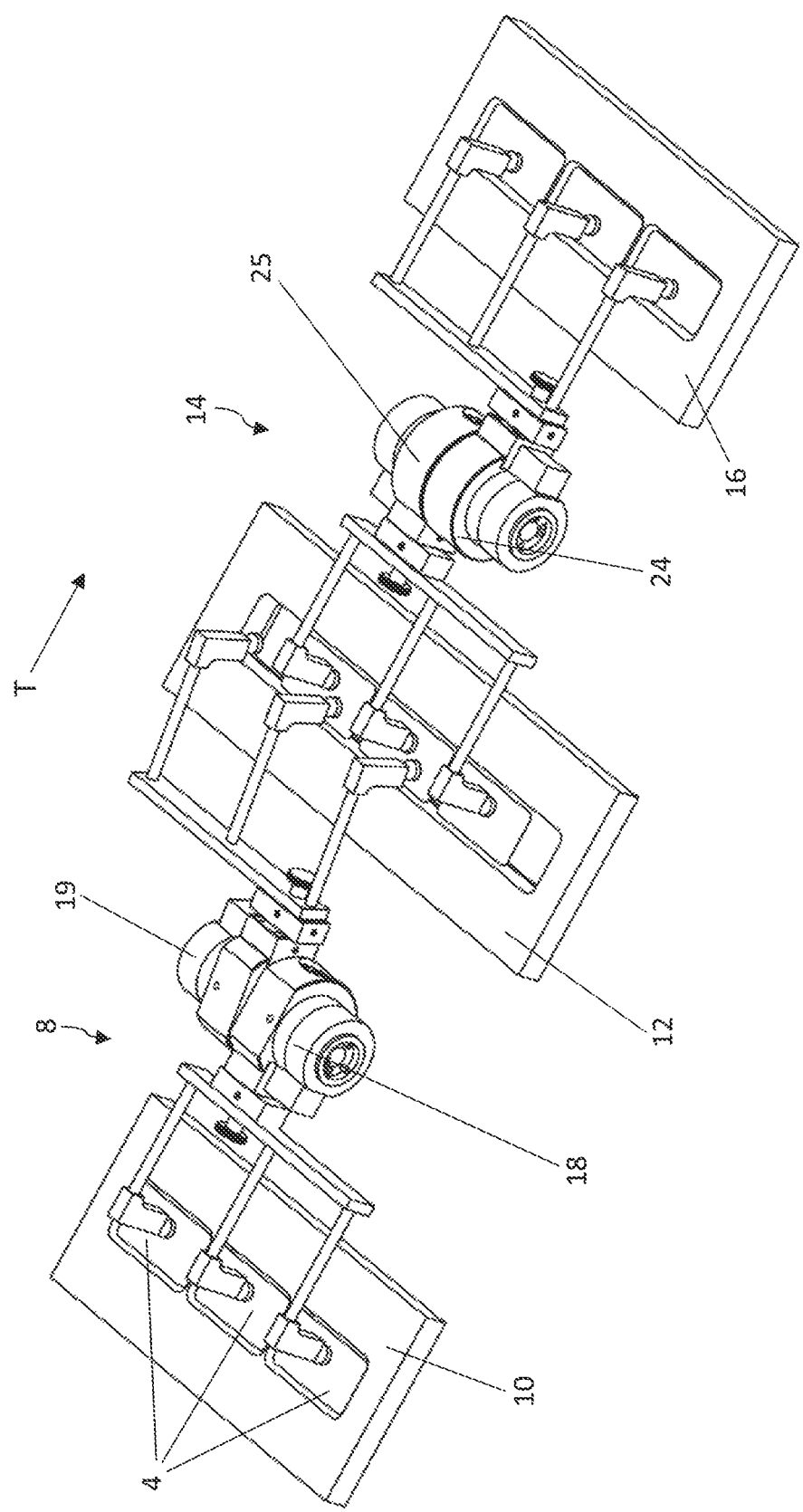

FIG. 1 shows the blister packs 4 immediately after they have left the ready positions 20. In FIG. 3, the blister packs 4 are on their way from the ready positions 20 to the intermediate place positions 22, where they are placed as shown in FIG. 4. In FIG. 5, the first suction arm is on the way back to its picking position. Meanwhile, the second suction arm 19 is completing an opposite movement. In FIG. 6 the transfer cycle begins again from the beginning.

As previously explained, it is possible to use a single suction arm instead of the two suction arms 18, 19 moving in opposite direction to transfer the two blister packs 4, 6 from the stamping station 10 to the intermediate place element 12.

As soon as the blister packs 4 have been provided in the intermediate place positions 22 of the intermediate place position area 23, the first blister packs 4 can be gripped there by the first suction arm 24 of the second transfer unit 14 and transferred to the final place positions 26. The first blister packs 4 in the intermediate place positions 22 are picked from above and also placed from above in the final place positions 26 on the conveying means 16. After being placed in the final place positions 26, the first blister packs 4 have the same side facing up as they did when in the intermediate place positions 22, but now with a rotation of 180° around their centers.

For the transfer of the second blister packs 6 from the intermediate place positions 22 of the intermediate place position area 23' to the common final place positions 26 by means of the second suction arm 25, what was said above concerning the transfer of the first blister packs 4 by means of the first suction arm 24 applies in exactly the same way here as well. The only difference is that the times at which the blister packs 6 are picked and at which the blister packs 6 are placed are substantially opposite the times at which the first blister packs 4 are picked and placed.

FIG. 1 shows the second blister packs 6 shortly after they have been gripped in the intermediate place positions 22. In FIG. 3, the blister packs 6 are on their way from the intermediate place positions 22 to the final place positions 26, where they are placed shortly after the time shown in FIG. 4. In FIG. 5, the second suction arm 25 is shown shortly after the placing step, and it is already on its return journey to its picking position The first suction arm 24, meanwhile, is completing an opposite movement. In FIG. 6, the cycle begins again from the beginning. The process is repeated as often as desired.

The two suction arms 24, 25 complete their pivoting movements around the same first axis A1, whereas the rotational movements of their two second segments 31, 33 around their own second axes A2, A2' proceed in opposite rotational directions. At the vertex of the rotational movement the blister packs are preferably parallel to the longitudinal center plane of the transfer unit 14, as shown in the cross section in FIG. 6 (see also FIG. 3).

The times at which the blister packs 4, 6 are picked from the intermediate place positions 22 must be coordinated with the times at which the blister packs 4, 6 are placed on the intermediate place positions 22 by the first transfer unit 8. To increase the throughput, it can be effective for a suction arm 24, 25 of the second transfer unit 14 to be picking the associated blister packs 4, 6 from the intermediate place positions 22 while the corresponding suction arm 18, 19 of the first transfer unit 24 is still in the area of the intermediate place positions 22. In a case such as this, the suction arms 18, 19, 24, 25 must have a geometry which allows the suction devices 34 of the suction arms 18, 19, 24, 25 to be offset from each other in the area of the intermediate place positions 22 (see FIG. 6).

The structure and drive of the suction arms 18, 19 of the first transfer unit 8 are preferably substantially identical to the structure and drive of the suction arms 24, 25 of the second transfer unit 14, as described in detail above.

Figure 12:
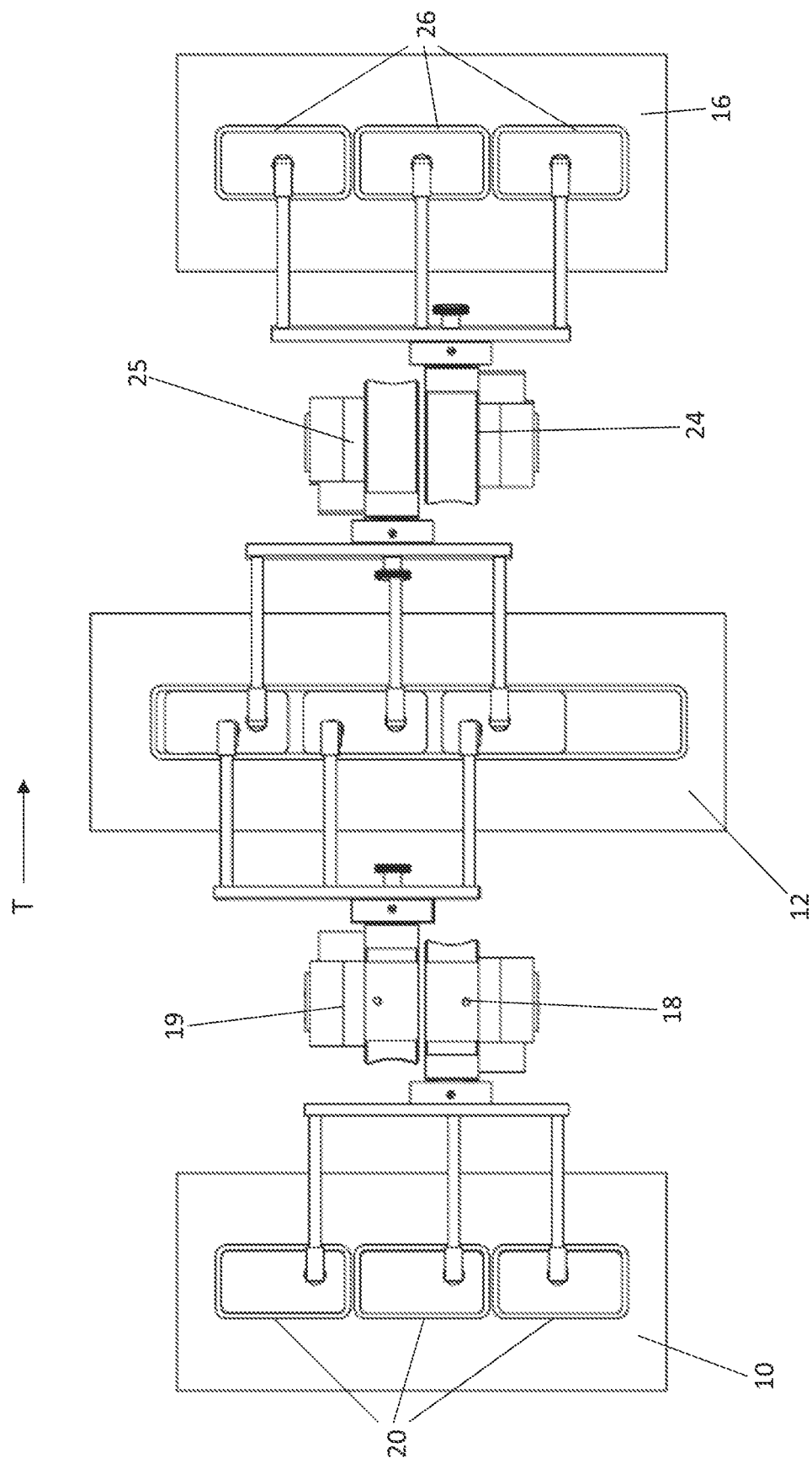
FIG. 12 is a top view of the variant of the device according to the present disclosure of FIG. 11.
Figure 13:
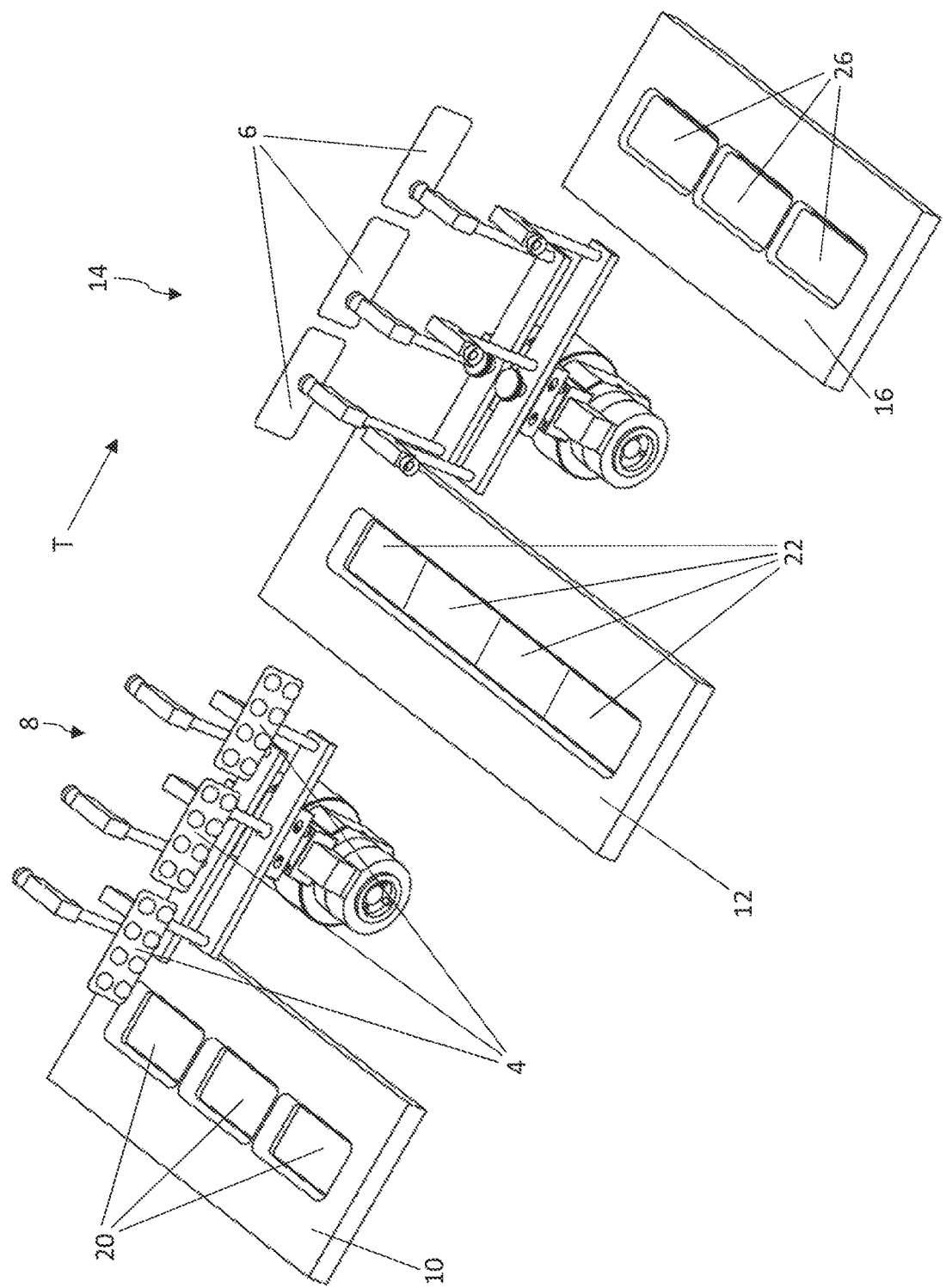
FIGS. 13-15 are schematic diagrams, in perspective, of the device of FIG. 11, showing various stages of the transfer process.
Figure 14:
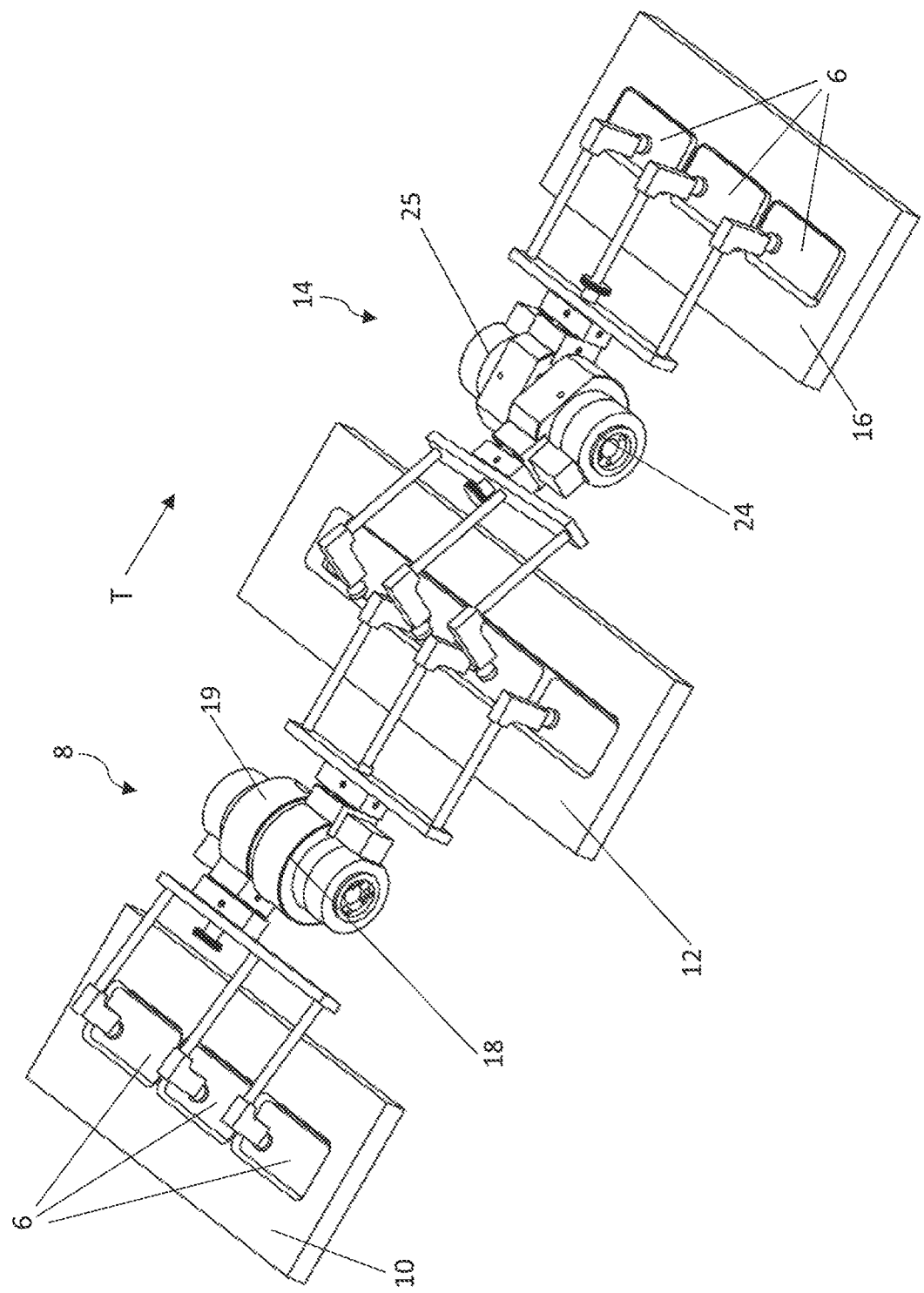
Figure 15:
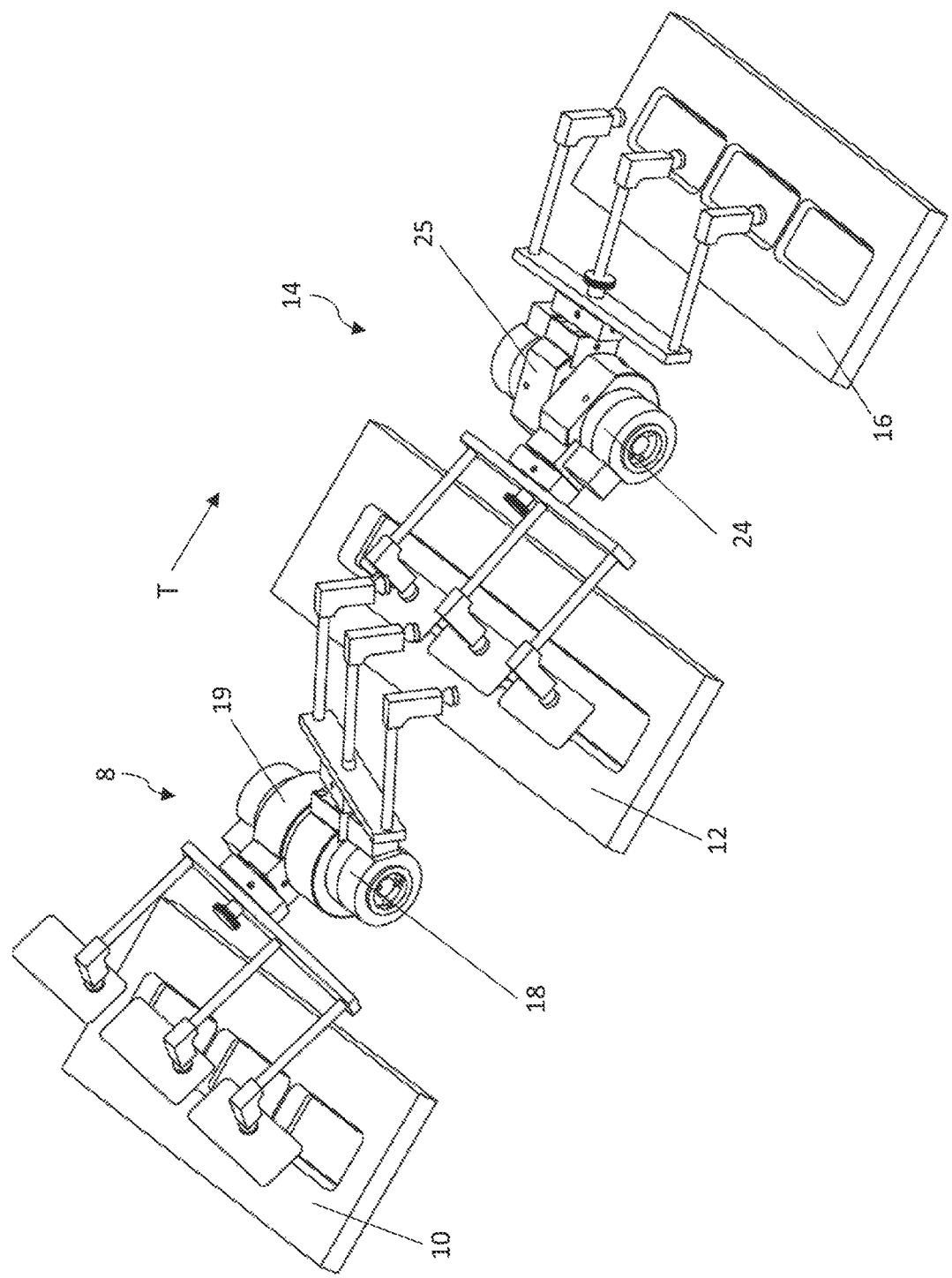
Figure 16:
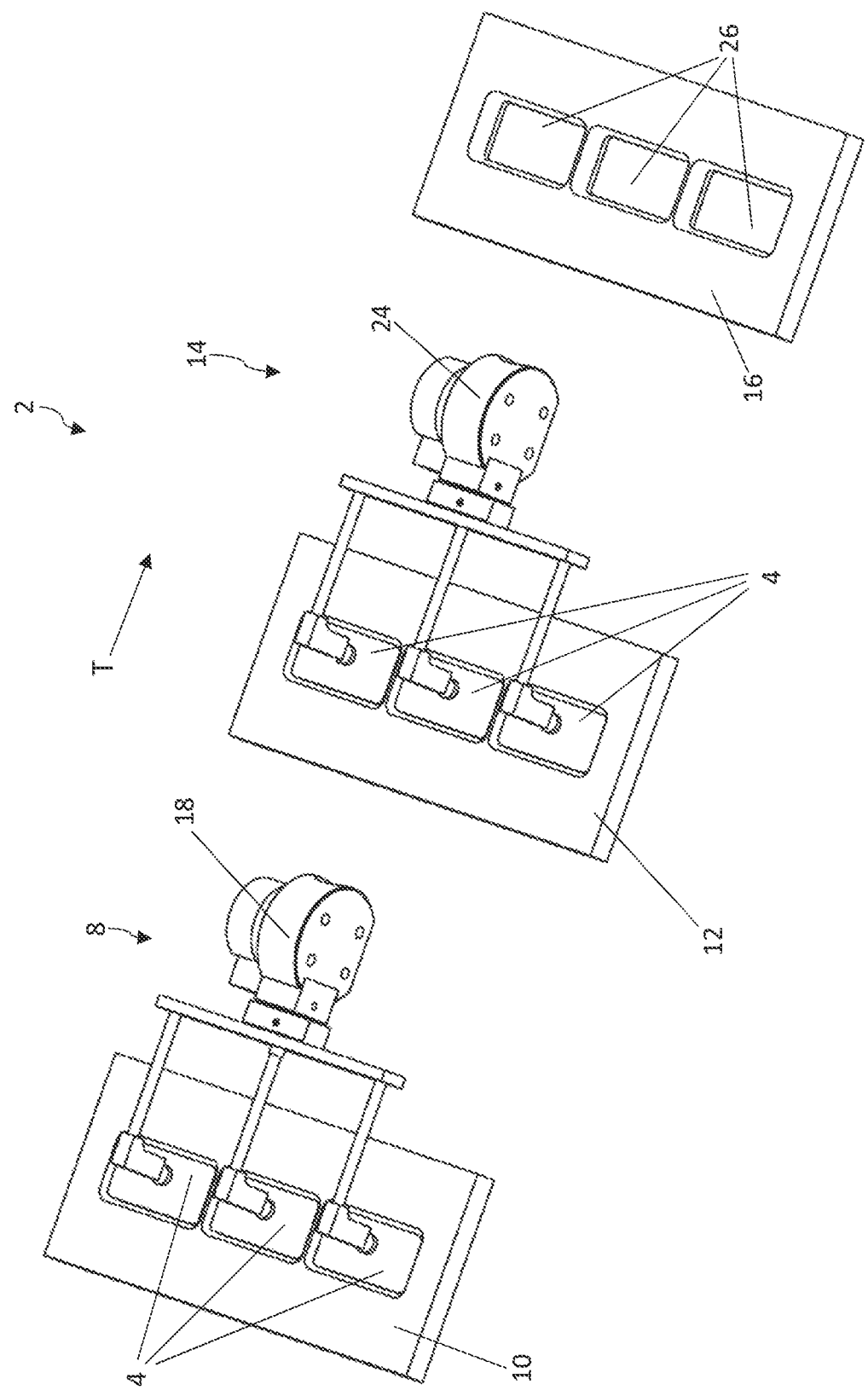
FIG. 16 is a schematic diagram, in perspective, of another variant of the device according to the present disclosure.
Figure 17:
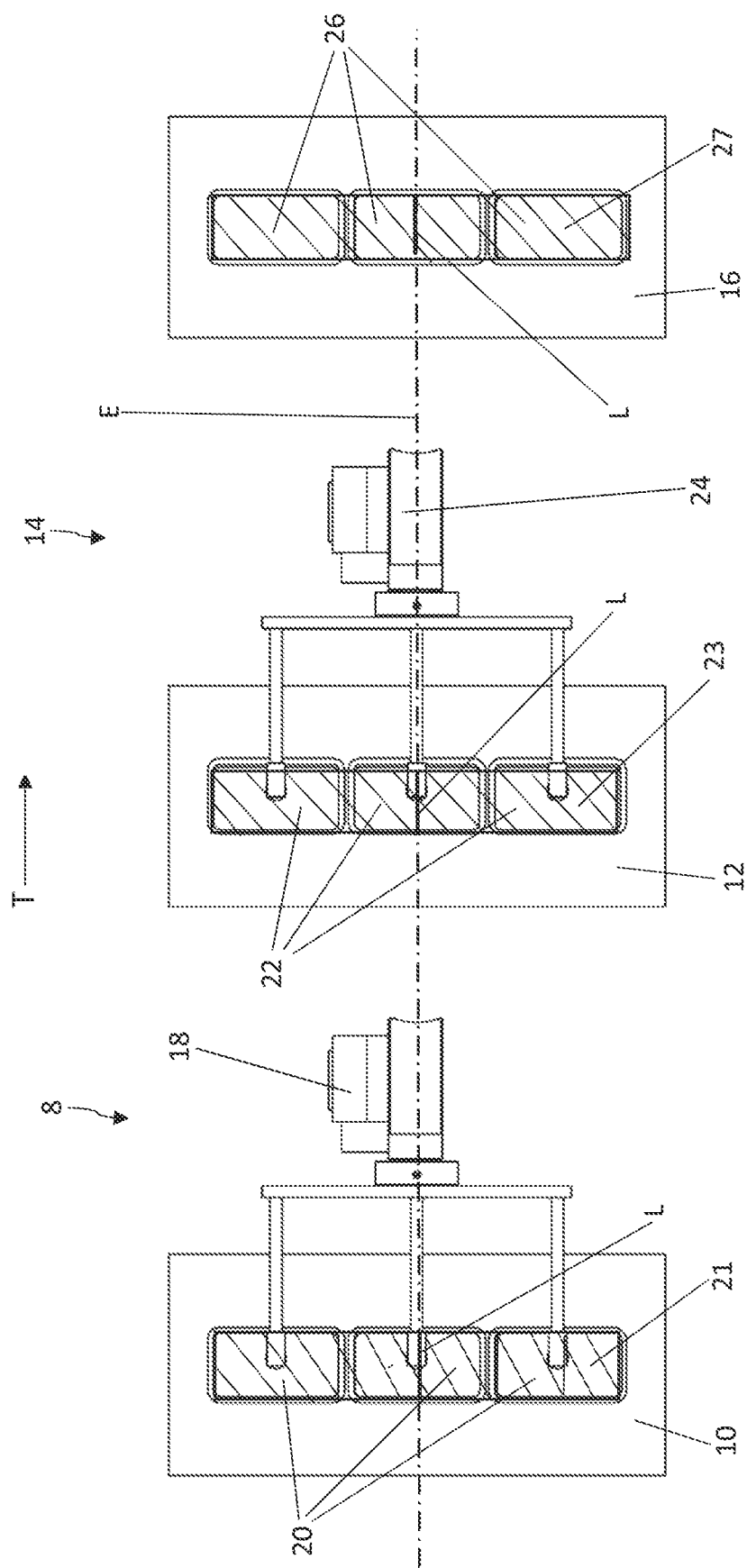
FIG. 17 is a top view of the variant of the device according to the present disclosure of FIG. 16.
Figure 18:
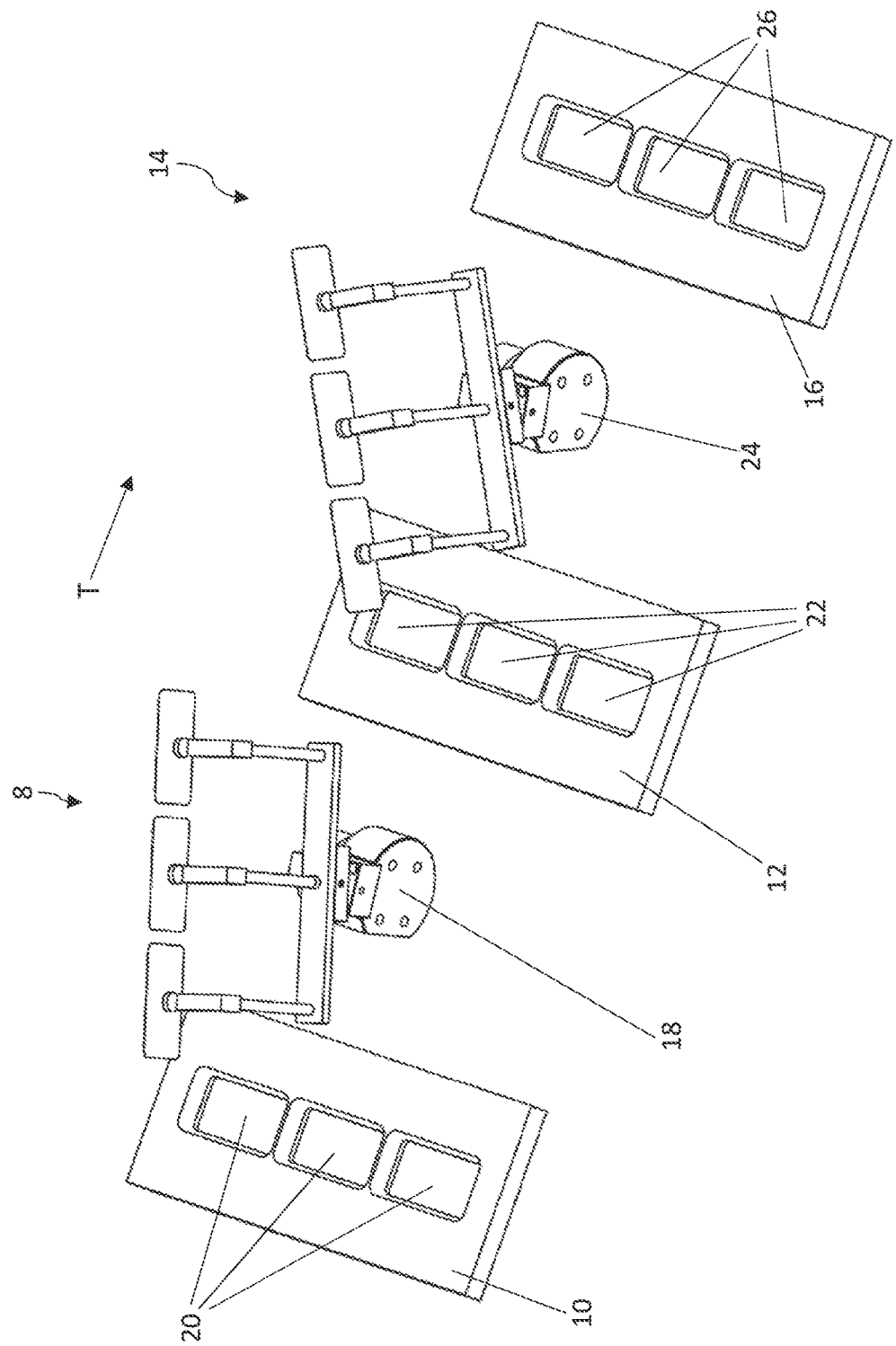
FIGS. 18-20 are schematic diagrams, in perspective, of the device of FIG. 16, showing various stages of the transfer process.
Figure 19:
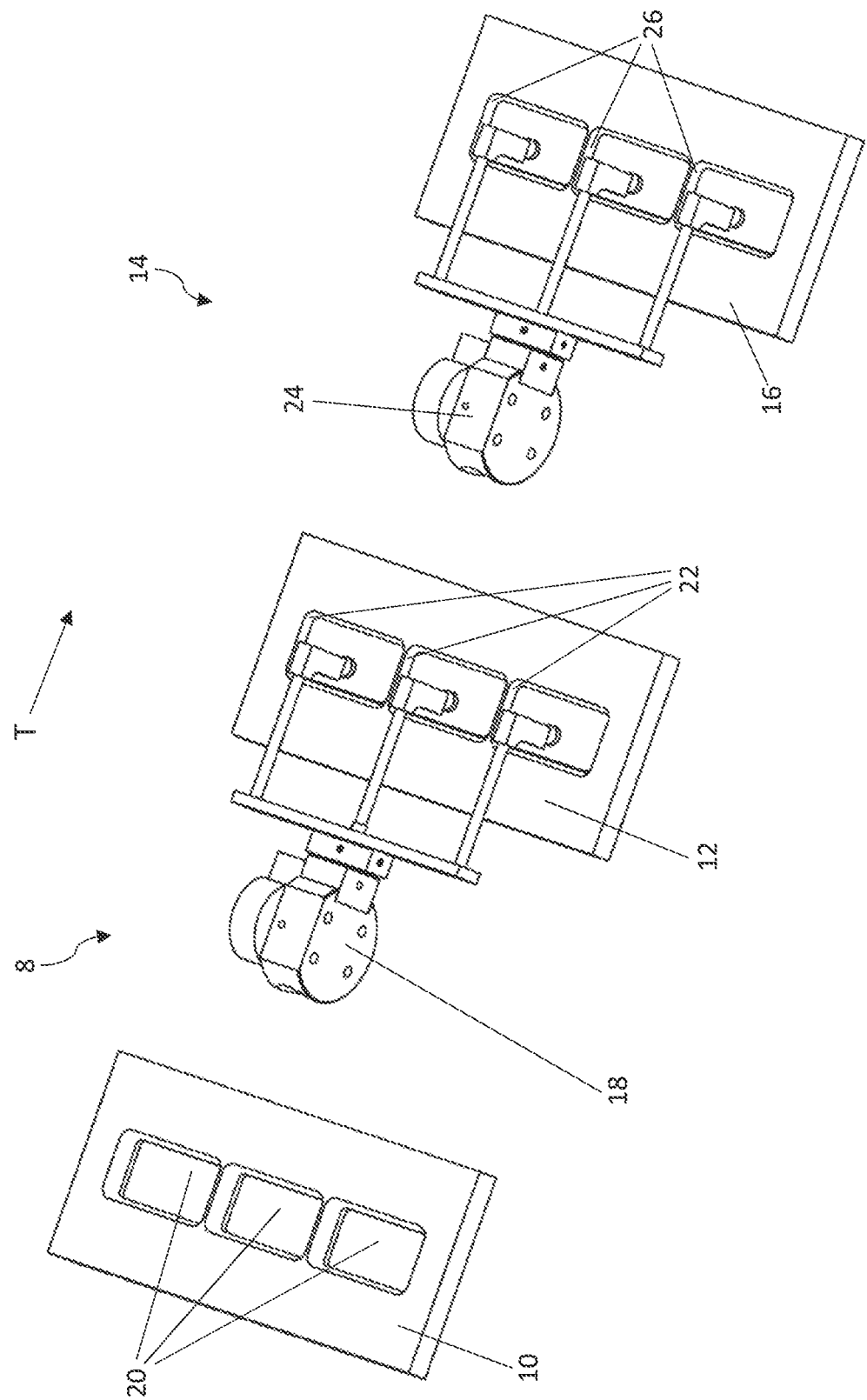
Figure 20:
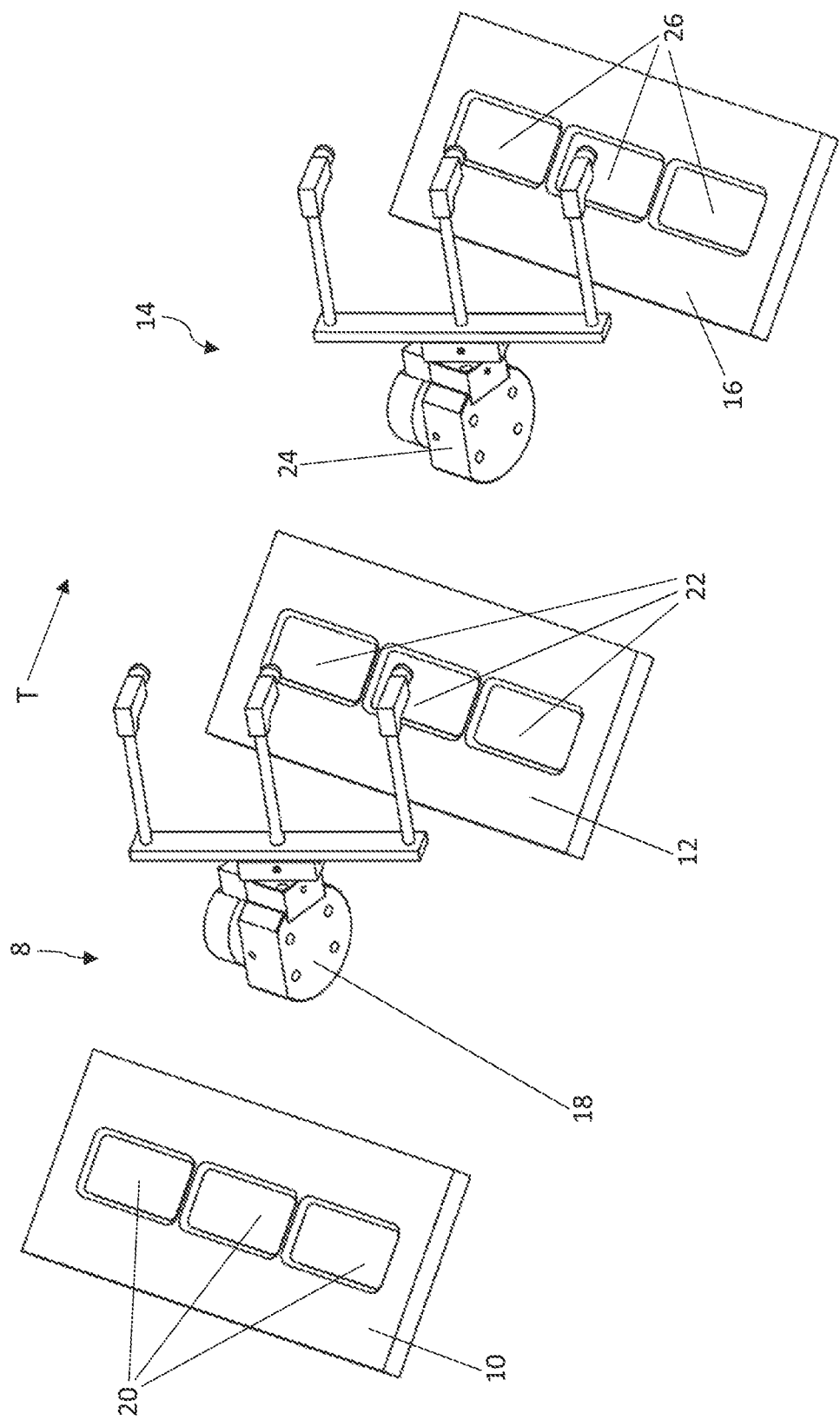

The embodiment according to FIGS. 11-15 differs from the previously described embodiment in that the blister packs 4, 6 acquire a lateral offset transverse to the transfer direction T as they travel from the stamping station 10 to the intermediate place element 12; in the case of the first suction arm 18, however, this lateral offset is toward the outside left, and in the case of the second suction arm 19 toward the outside right. Another difference is that each of these lateral offsets is lost when the blister packs 4, 6 are transferred from the intermediate place element 12 to the conveying means 16. As can be seen in FIG. 12, the ready positions 20 of the blister packs 4, 6 in the stamping station 10 lie on a line in the transfer direction T with the final place positions 26 on the conveying means 16.

In comparison to the stepwise offsetting of the blister packs 4, 6 in the embodiment according to FIGS. 1-10, the different lateral offsets of the blister packs 4, 6 is achieved by the arrangement of the second rotational axes A2, A2' of the second segments 31, 33 of the associated suction arms 18, 19, 24, 25 relative to the center of the ready position area 21, to the center of the intermediate place position area 23, 23', and to the center of the final place position area 27. Otherwise, the structure of the suction arms 18, 19, 24, 25 is preferably identical to that described on the basis of FIGS. 1-10.

In the embodiment according to FIGS. 16-20, the transfer in both the first transfer unit 8 and the second transfer unit 14 occurs by means of only one suction arm 18, 24. Finally, the plane E, in which the second axes A2 of the suction arms 18, 24 move, intersects the ready position area 21, the intermediate place position area 23, and final place position area 27 along straight lines L, which are centered with respect to the above-cited areas. As a result, there is no lateral offset of the blister packs 4 during their transfer. The structure and drive of the suction arms 18, 24 are otherwise again preferably identical to those described on the basis of FIGS. 1-10.

As previously mentioned, in all of the embodiments, the picking of the blister packs 4, 6 from the ready positions 20 is preferably done from above. Under certain circumstances it is also possible that the blister packs 4, 6 in the ready positions 20 could be oriented vertically, for example, or at a certain angle to the vertical instead of being oriented horizontally. In this case, the suction arms 18, 19 complete a pivoting movement around the first axis A1 only around an angle of less than 180°, usually an angle in the range of 60-180°. The ratio between the bevel gears 56, 60 must then be adapted correspondingly to ensure that, during this reduced pivoting movement around the first axis A1, the second segment 31, 33 completes a full 180° rotation around the second axis A2, A2'.

Generally, each of the blister packs 4, 6 is preferably held in place in the ready positions 20 by means of a suitable retainer until it is gripped by one of the suction arms 18, 19. The retainers must release the blister packs 4, 6 promptly before the transfer movement.

Generally, each of the blister packs 4, 6 is preferably held in place in the intermediate place positions 22 by means of a suitable retainer until it is gripped by one of the suction arms 24, 25. The retainers must release the blister packs 4, 6 promptly before the transfer movement.

In the embodiments of FIGS. 1-15 described above, two suction grippers 18, 19; 24, 25 were described for each transfer unit 8, 14, but it is also conceivable that only one of the described suction grippers could be used in one or both transfer units 8, 14.

In the embodiment of FIGS. 16-20, the blister packs 4 do not become laterally offset during the transfer. The ready position area 21, the intermediate place position area 23, 23', and the final place position area 27 lie on a line. In the case of the embodiments of FIGS. 1-15, however, the blister packs do acquire a lateral offset during the transfer. The ready position area 21 and the intermediate place position area 23, 23' do not lie on a line, and/or the intermediate place position area 23, 23' and the final place position area 27 do not lie on a line.

It is also possible that a transfer unit 8, 14 according to FIGS. 1-15 could be combined with a transfer unit 8, 14 according to FIGS. 16-20; that is, it is possible to combine a transfer producing a lateral offset with a transfer unit which does not produce a lateral offset. It is also possible that only one suction arm 18, 19, 24, 25 selected from one of the embodiments according to FIGS. 1-15 could be combined with a transfer unit 8, 14 according to FIGS. 16-20.

It would also be possible to combine one of the transfer units 8, 14 of FIGS. 1-10 with one of the transfer unit 8, 14 according to FIGS. 11-15; to combine only one suction arm selected from one of the transfer unit units 8, 14 of FIGS. 1-10 with one of the transfer units 8, 14 according to FIGS. 11-15; or to combine one of the transfer units 8, 14 of FIGS. 11-15 with only one suction arm selected from one of the transfer units 8, 14 according to FIGS. 1-10.

In the exemplary embodiments presented here, three blister packs 4, 6 are transferred simultaneously by means of one suction arm in each case. It is also possible, however, to transfer only two or more than three blister packs 4, 6 simultaneously.

The blister packs 4, 6 usually contain tablets, capsules, or sugar-coated pills. The blister packs 4, 6 are usually sealed with a flat lidding foil, upon which the suction heads 36 can act. It is also conceivable, however, that the blister packs 4, 6 could remain open at the top. This is possible especially in cases where, instead of tablets, other medical products such as syringes, ampoules, vials, or the like have been packaged. In cases where blister pack 4, 6 has no lidding foil, it is advantageous for the suction heads 36 to be adapted to the shape of the product and to act directly on the product held in place in the blister pockets. The blister packs 4, 6 can also contain nonmedical products.

The invention claimed is:

1. A device for transferring blister packs comprising:
a first transfer unit for transferring the blister packs from a stamping station, a transport means, or an intermediate storage area to an intermediate place element; and
a second transfer unit for transferring the blister packs from the intermediate place element to a conveying means or a storage area;
wherein the second transfer unit comprises a suction arm, which is movable between a picking position, in which the suction arm picks several blister packs from several intermediate place positions on the intermediate place element, and a placing position, in which the suction arm places the several blister packs in several final place positions on the conveying means or in the storage area;
wherein the suction arm comprises a first segment and a second segment, wherein the first segment of the suction arm is mounted rotatably around an associated first axis;
wherein the first segment of the suction arm comprises a section to which the second segment is attached such that it is rotatable around a non-stationary second axis substantially perpendicular to the first axis, wherein a suction device for picking and holding the blister packs is arranged on the second segment;
wherein the suction arm is configured and actuated such that a movement of the suction arm from the picking position to the placing position and back is a combined movement, which comprises at least a first rotational movement of the first segment and of the second segment around the first axis and a second rotational movement of the second segment around the second axis;
wherein the suction arm is configured and actuated such that the blister packs in the intermediate place positions are picked simultaneously from above by the suction device of the suction arm and are also placed simultaneously from above in the final place positions;
wherein the several intermediate place positions are arranged next to each other in a row parallel to the first axis and jointly form an intermediate place position area; and wherein the several final place positions are arranged next to each other in a row parallel to the first axis and jointly form a final place position area.

2. The device of claim 1, wherein the second axis of the suction arm is arranged such that, during the first rotational movement of the first segment of the suction arm, the second axis moves in a plane, which intersects the intermediate place position area and the final place position area along a straight line; wherein the straight line is arranged in an area of a center of the intermediate place position area and a center of the final place position area.

3. The device of claim 1, wherein the second axis of the suction arm is arranged such that, during the first rotational movement of the first segment of the suction arm, the second axis moves in a plane, which intersects the intermediate place position area or a lateral projection thereof along a straight line, which is laterally offset from a center of the intermediate place position area.

4. The device of claim 1, wherein the second segment and thus the blister packs held on the suction device, execute a rotational movement around the second axis of substantially 180° when the suction arm moves from the picking position to the placing position or vice versa.

5. The device of claim 1, wherein the first segment executes a rotational movement around the first axis of 120-180° when the suction arm moves from the picking position to the placing position or vice versa.

6. The device of claim 1, wherein the suction arm is supported shiftably in a direction parallel to the first axis.

7. The device of claim 1, wherein the suction device comprises several suction heads, which are attached to the second segment by means of at least one support arm.

8. The device of claim 7, wherein the at least one support arm is rigidly attached to the second segment.

9. The device of claim 7, wherein the at least one support arm, when in the picking or placing position, projects downward at a slant from the second segment.

10. A method for transferring blister packs from a stamping station, a transport means, or an intermediate storage area to an intermediate place element and from the intermediate place element to a conveying means or to a storage area by means of a device, comprising the steps of:
transferring several blister packs from the stamping station, the transport means, or the intermediate storage area to the intermediate place element, wherein the blister packs are placed on the intermediate place element next to each other in a row in several intermediate place positions;

picking the several blister packs from the several intermediate place positions of the intermediate place element, moving the blister packs, and placing the blister packs in several final place positions on the conveying means or in the storage area, wherein the blister packs in the final place positions are arranged next to each other in a row parallel to the row of blister packs in the intermediate place positions;

wherein the blister packs in the intermediate place positions are picked simultaneously from above and are also placed simultaneously from above in the final place positions on the conveying means or in the storage area; and wherein, after the blister packs have been placed in the final place positions, the blister packs have the same side facing up as in the intermediate place positions but now rotated by 180° around centers of each of the blister packs.

11. The method of claim 10, wherein the picking of the blister packs from the intermediate place element, the moving of the blister packs, and the placing on the conveying means or in the storage area is performed by a suction arm, which executes a back-and-forth pivoting movement.

12. The method of claim 10, wherein, in case of an even number of blister packs, the final place positions of all of the blister packs are exchanged in comparison to the intermediate place positions; or wherein, in case of an odd number of blister packs, the final place positions of all of the blister packs except for a central blister pack are exchanged in comparison to the intermediate place positions.

13. The method of claim 10, wherein the transfer of the blister packs from the stamping station, the transport means, or the intermediate storage area to the intermediate place element comprises the steps of:

picking the several blister packs from several ready positions of the stamping station, the transport means, or the intermediate storage area; moving the blister packs; and placing the blister packs in the intermediate place positions on the intermediate place element; wherein the blister packs are placed from above in the intermediate place positions on the intermediate place element.

14. The method of claim 13, wherein the blister packs in the ready positions are arranged next to each other in a row parallel to the rows of blister packs in the intermediate place positions and in the final place positions; and wherein the blister packs in the intermediate place positions are placed with a rotation of 180° around their centers in comparison to the ready positions.

15. The method of claim 14, wherein the blister packs are transferred simultaneously from the stamping station, the transport means, or the intermediate storage area to the intermediate place element.

* * * * *